US007054888B2

(12) United States Patent
LaChapelle et al.

(10) Patent No.: US 7,054,888 B2
(45) Date of Patent: May 30, 2006

(54) OPTIMIZING MEDIA PLAYER MEMORY DURING RENDERING

(75) Inventors: Kevin Leigh LaChapelle, Redmond, WA (US); Ian Cameron Mercer, Sammamish, WA (US); Nobuyasu Takeguchi, Kawachinagano (JP); Toshihiko Mizukami, Hirakata (JP); Yoshifumi Yanagawa, Kyoto (JP); Chiyoko Matsumi, Suita (JP); Harutoshi Miyamoto, Ibaraki (JP); Yasuyuki Torii, Yawata (JP); Keisuke Matsuo, Ikoma (JP)

(73) Assignees: Microsoft Corporation, Redmond, WA (US); Matsushita Electric Industrial Co., Ltd., Osaka (JP)

( * ) Notice: Subject to any disclaimer, the term of this patent is extended or adjusted under 35 U.S.C. 154(b) by 442 days.

(21) Appl. No.: 10/273,416

(22) Filed: Oct. 17, 2002

(65) Prior Publication Data

US 2004/0078357 A1    Apr. 22, 2004

Related U.S. Application Data

(60) Provisional application No. 60/418,973, filed on Oct. 16, 2002.

(51) Int. Cl.
*G06F 17/30* (2006.01)
(52) U.S. Cl. .................. 707/104.1; 707/10; 707/102; 707/203
(58) Field of Classification Search ............ 707/10, 707/102, 104, 511, 104.1, 203, 205; 709/231, 709/203, 226, 236; 345/501, 810; 386/95; 715/751; 382/100; 700/94
See application file for complete search history.

(56) References Cited

U.S. PATENT DOCUMENTS

| 5,428,732 A | 6/1995 | Hancock et al. |
| 5,616,876 A | 4/1997 | Cluts |
| 5,742,347 A | 4/1998 | Kandlur et al. |
| 5,870,553 A | 2/1999 | Shaw et al. |
| 5,892,535 A | 4/1999 | Allen et al. |
| 5,996,015 A | 11/1999 | Day et al. |
| 6,006,234 A | 12/1999 | Govindarajan et al. |
| 6,201,540 B1 | 3/2001 | Gallup et al. |

(Continued)

FOREIGN PATENT DOCUMENTS

EP    1288942 A1    3/2003

(Continued)

OTHER PUBLICATIONS

Hu et al., "Multimedia Description Framework (MDF) for content description of Audio/Video Documents," Proceedings of the fourth ACM conference on Digital libraries, 1999, pp. 67-75, ACM Press, New York, U.S.A.

(Continued)

*Primary Examiner*—Thuy N. Pardo
(74) *Attorney, Agent, or Firm*—Senniger Powers

(57) ABSTRACT

Optimizing operation of a media player during rendering of media files. The invention includes authoring software to create a data structure and to populate the created data structure with obtained metadata. The invention also includes rendering software to retrieve the metadata from the data structure and to identify media files to render. In one embodiment, the invention is operable as part of a compressed media format having a set of small files containing metadata, menus, and playlists in a compiled binary format designed for playback on feature-rich personal computer media players as well as low cost media players.

52 Claims, 8 Drawing Sheets

U.S. PATENT DOCUMENTS

| | | |
|---|---|---|
| 6,356,921 B1 | 3/2002 | Kumar et al. |
| 6,484,156 B1 | 11/2002 | Gupta et al. |
| 6,526,411 B1 | 2/2003 | Ward |
| 6,557,042 B1 | 4/2003 | He et al. |
| 6,657,117 B1 | 12/2003 | Weare et al. |
| 6,661,437 B1 | 12/2003 | Miller et al. |
| 6,721,489 B1 | 4/2004 | Banyamin et al. |
| 6,728,729 B1 | 4/2004 | Jawa et al. |
| 6,735,628 B1 | 5/2004 | Eyal |
| 6,760,721 B1 | 7/2004 | Chasen et al. |
| 6,839,059 B1 * | 1/2005 | Anderson et al. ........... 345/501 |
| 6,865,431 B1 | 3/2005 | Hirota et al. |
| 6,975,746 B1 * | 12/2005 | Davis et al. ................ 382/100 |
| 2001/0001160 A1 | 5/2001 | Shoff et al. |
| 2001/0011284 A1 * | 8/2001 | Humpleman et al. ....... 707/511 |
| 2002/0026521 A1 * | 2/2002 | Sharfman et al. ........... 709/231 |
| 2002/0033844 A1 | 3/2002 | Levy et al. |
| 2002/0078144 A1 * | 6/2002 | Lamkin et al. ............. 709/203 |
| 2002/0082730 A1 * | 6/2002 | Capps et al. .................. 700/94 |
| 2002/0122137 A1 | 9/2002 | Chen et al. |
| 2002/0138619 A1 * | 9/2002 | Ramaley et al. ............ 709/226 |
| 2002/0151363 A1 | 10/2002 | Letovsky et al. |
| 2002/0172495 A1 | 11/2002 | Han |
| 2002/0180803 A1 * | 12/2002 | Kaplan et al. ............... 345/810 |
| 2003/0009452 A1 | 1/2003 | O'Rourke et al. |
| 2003/0016950 A1 * | 1/2003 | Ando et al. .................... 386/95 |
| 2003/0023975 A1 | 1/2003 | Schrader et al. |
| 2003/0108335 A1 * | 6/2003 | Nakamura et al. ............ 386/95 |
| 2003/0151618 A1 | 8/2003 | Johnson et al. |
| 2003/0236912 A1 * | 12/2003 | Klemets et al. ............. 709/236 |
| 2004/0001106 A1 | 1/2004 | Deutscher et al. |
| 2004/0003398 A1 | 1/2004 | Donian et al. |
| 2004/0034653 A1 * | 2/2004 | Maynor et al. ............. 707/102 |
| 2004/0064476 A1 | 4/2004 | Rounds |
| 2005/0081159 A1 * | 4/2005 | Gupta et al. ................ 715/751 |

FOREIGN PATENT DOCUMENTS

| | | |
|---|---|---|
| WO | WO 01/28222 A2 | 4/2001 |
| WO | WO 03/023781 A1 | 3/2003 |

OTHER PUBLICATIONS

Mueller, "Mediacaptain—an Interface for Browsing Streaming Media," Proceedings of the eighth ACM international conference on Multimedia, 2000, p. 419-421, ACM Press, New York, U.S.A.

Crossen et al., "Flytrap: Intelligent Group Music Recommendation," Proceedings of the 7th international conference on Intelligent user interfaces, 2002, pp. 184-185, ACM Press, New York, U.S.A.

Dunne et al., "mpME!: Music Recommendation and Exploration," Proceedings of the 7th international conference on Intelligent user interfaces, 2002, p. 235, ACM Press, New York, U.S.A.

* cited by examiner

FIG. A1
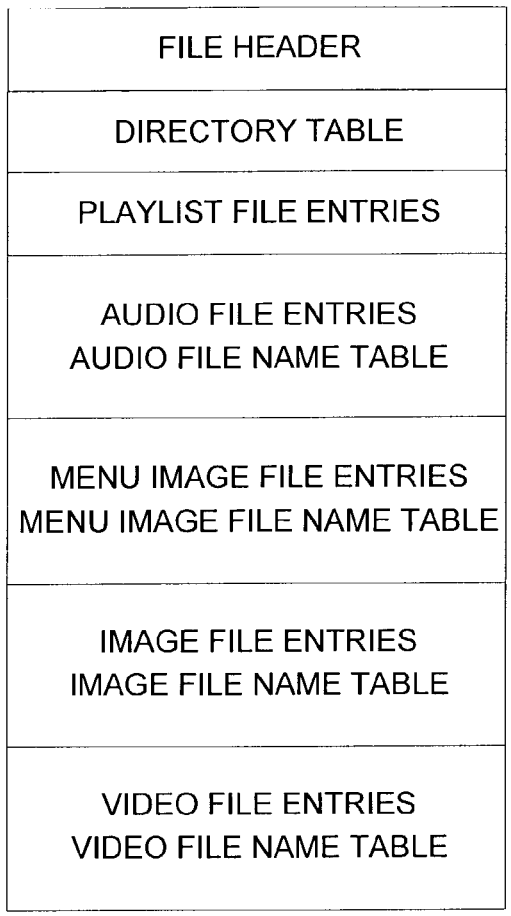
FIG. A2
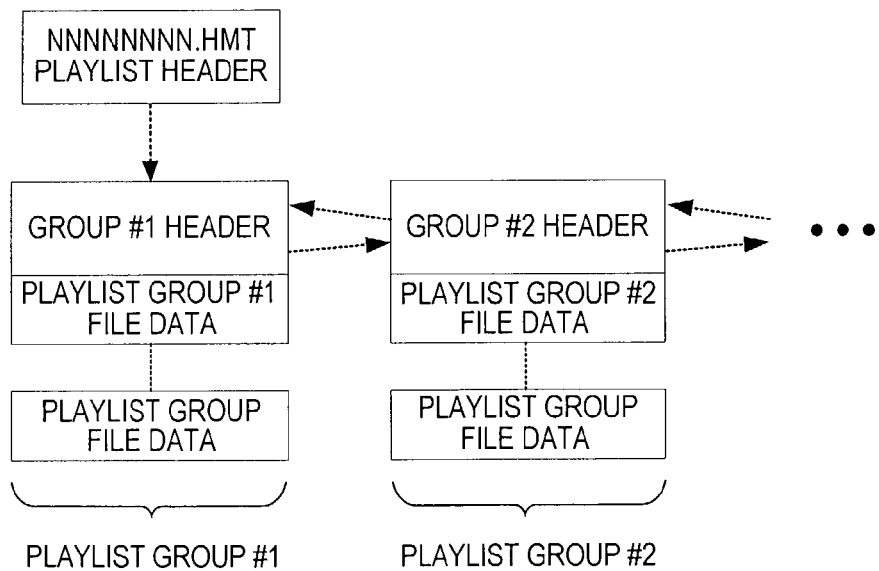

FIG. A3
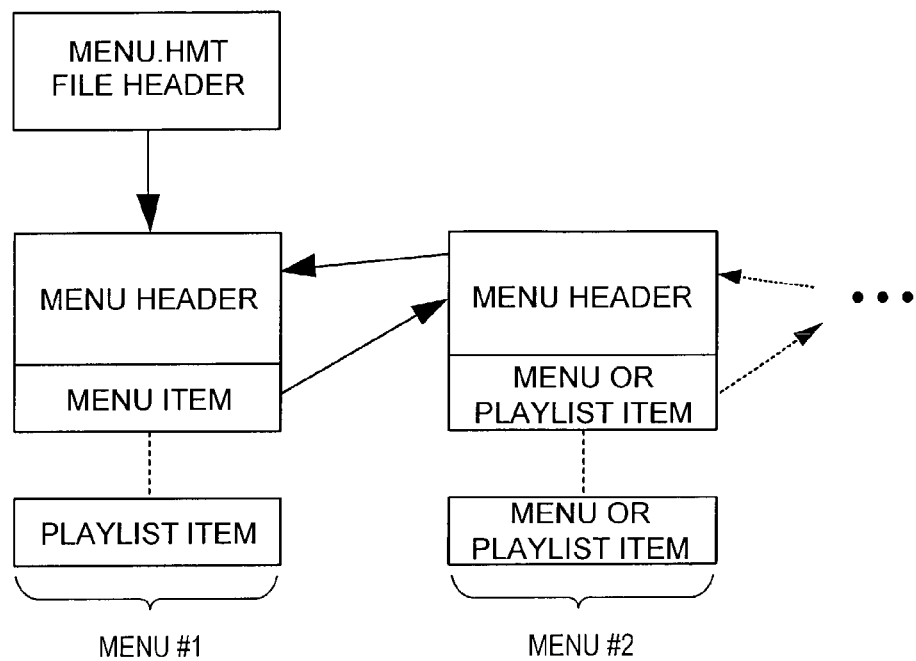
FIG. A4
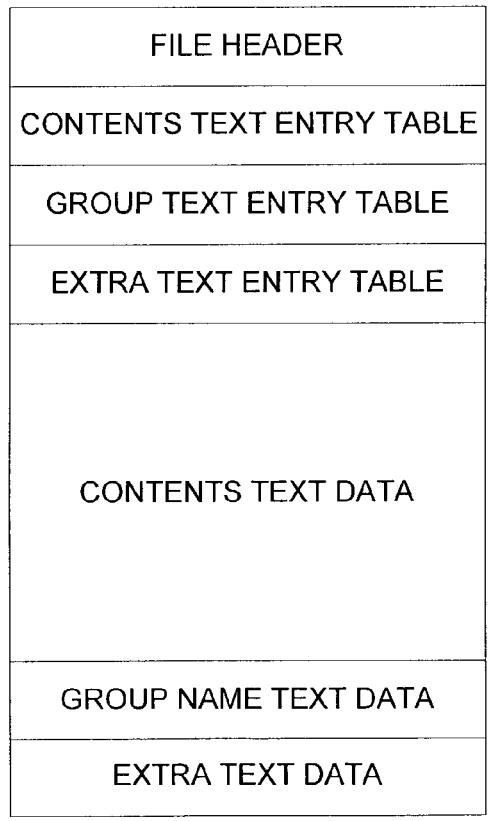

OPTIMIZING MEDIA PLAYER MEMORY DURING RENDERING

CROSS-REFERENCE TO RELATED APPLICATION

This application is based upon a U.S. Provisional Patent Application 60/418,973 entitled "COMPRESSED MEDIA FORMAT SPECIFICATION," filed Oct. 16, 2002, naming Mercer et al. as inventors. The entirety of such provisional patent application is incorporated by reference herein.

TECHNICAL FIELD

The present invention relates to the field of digital media content. In particular, this invention relates to optimizing media player memory usage during rendering.

BACKGROUND OF THE INVENTION

Due to recent advances in technology, computer users are now able to enjoy many features that provide an improved user experience, such as playing various media and multimedia content on their personal or laptop computers. For example, most computers today are able to play compact discs (CDs) so users can listen to their favorite musical artists while working on their computers. Many computers are also equipped with digital versatile disc (DVD) drives enabling users to watch movies.

When music is played on a personal computer (PC) from compressed media files such as Moving Picture Experts Group audio layer-3 (MP3) files and WINDOWS MEDIA technologies audio (WMA) files, the PC typically holds in memory a complete database of all albums, artists, genres, years, etc., and allows the user to navigate amongst these attributes. However, when music is copied to a writeable CD or DVD and played in a portable CD player, car receiver, DVD player, or any other consumer electronic device having a relatively low power processor, limited memory availability, cheap drive mechanism and often limited display and user input capabilities, the same scope of metadata is not available.

Presently available media players that render compressed media content can take a long time to start playback of audio (e.g., typically around thirty seconds, but some can take several minutes or more). The slow start-up time of such media players is due in part to the time needed for the media player to scan the entire medium storing the media content to build a list of files that the media player can render along with any relevant metadata (e.g., title, artist, and genre) retrieved from each individual media file. Often, existing media players do not retrieve or display any metadata associated with the compressed media content. Such existing media players fail to provide rich navigation capabilities such as play-by-genre or play-by-artist. The lack of rich navigation capabilities is due in part to insufficient memory and processing power of the existing media players to sort and aggregate the metadata from the media content into menus and playlists dynamically.

For these reasons, a system for optimizing media player memory usage during rendering is desired to address one or more of these and other disadvantages.

SUMMARY OF THE INVENTION

The invention includes software for optimizing operation of a media player during rendering of media files. In particular, the invention includes authoring software to create a data structure and to populate the created data structure with obtained metadata. According to the invention, rendering software retrieves the metadata from the data structure and identifies media files to render.

A metadata cache of the invention provides memory usage and disk-read optimization by separating text and binary metadata into different cached files and by the actual layout of the caches. The optimized metadata cache stores relevant metadata from each of the compressed media files. Various mechanisms are used to ensure the coherency of the cache and the compressed media files, for example, on a computer-readable medium, by only recognizing the metadata cache when it is present in the last session on the medium. The media players use the cache to efficiently identify the audio, video or image files on the media and any relevant information about each file. In one embodiment, the invention software reduces lengthy startup time significantly, as the media player only needs to load the metadata cache file to begin playback and does not need to first scan all the files on the medium. Further, the media player does not need to open and read the header of each media file to collect metadata from it. Thus, the total number and distance of disk-seek operations and the total number of disk-read operations is minimized. Even slow media player mechanisms provide the user with an improved playback experience when rendering media content created according to the invention software.

According to the invention, the metadata cache contains the relevant binary and text metadata organized in a memory-efficient manner, which minimizes the memory footprint at all times during disk loading and disk playback. Memory usage is minimized and memory can be efficiently reclaimed after loading is complete and before playback begins. This allows the maximum possible amount of memory to be available for storing compressed music samples or other media files during rendering. Memory usage is further optimized based on a hierarchical capability list of playback devices. That is, the simplest audio-only devices use the least amount of memory while a higher-powered video player might use more memory, yet the same medium is still playable in each device supporting all the capabilities of that device.

In accordance with one aspect of the invention, a method optimizes operation of a media player. The media player accesses a computer-readable medium for rendering media files stored thereon. The computer-readable medium also stores memory optimizing data associated with the media files. The method obtains metadata for one or more selected media files. The method also creates a data structure accessible by the media player prior to rendering the selected media files. The method also populates the created data structure with said obtained metadata. The method also stores the populated data structure on the computer-readable medium with the selected media files.

In accordance with one aspect of the invention, one or more computer-readable media in a media authoring tool have computer-executable components for optimizing operation of a media player. The media player accesses a computer-readable medium for rendering media files stored thereon. The computer-readable medium also stores memory optimizing data associated with the media files. The components include a preparation module for obtaining metadata for one or more selected media files. The components also include an initialization module for creating a data structure adapted accessible by the media player prior to rendering the selected media files. The components also include an organization module for populating the created data structure from the initialization module with the obtained metadata from the preparation module. The components also include a writer module for storing the populated data structure from the organization module on the computer-readable medium with the selected media files.

In accordance with another aspect of the invention, a method optimizes operation of a media player. The media player accesses a computer-readable medium for rendering media files stored thereon. The computer-readable medium also stores memory optimizing data associated with the media files. The method retrieves the memory optimizing data stored on the computer-readable medium prior to rendering the media files. The memory optimizing data is associated with one or more selected media files stored on the computer readable medium. The method also identifies the selected media files in response to the retrieved memory optimizing data. The selected media files are adapted to be rendered by the media player.

In accordance with yet another aspect of the invention, a media player has one or more computer-readable media storing computer-executable components for optimizing operation of the media player. The media player accesses a computer-readable medium for rendering media files stored thereon. The computer-readable medium also stores memory optimizing data associated with the media files. The components include an input module for retrieving the memory optimizing data stored on the computer-readable medium prior to rendering the media files. The memory optimizing data is associated with one or more selected media files stored on the computer readable medium. The components also include a filter module for identifying the selected media files in response to the retrieved memory optimizing data from the input module. The selected media files are adapted to be rendered by the media player.

In accordance with still another aspect of the invention, a computer-readable medium has stored thereon a data structure representing memory optimizing data associated with one or more media files stored thereon. The memory optimizing data optimizes operation of a media player. The media player accesses the computer-readable medium for rendering the media files. The data structure includes a header including an offset field storing a reference to textual and binary data associated with one or more media files. The data structure also includes a directory table matching directory numbers to directory names associated with the media files, wherein the header references the media files by the directory numbers.

Alternatively, the invention may comprise various other methods and apparatuses.

Other features will be in part apparent and in part pointed out hereinafter.

Figure 1:
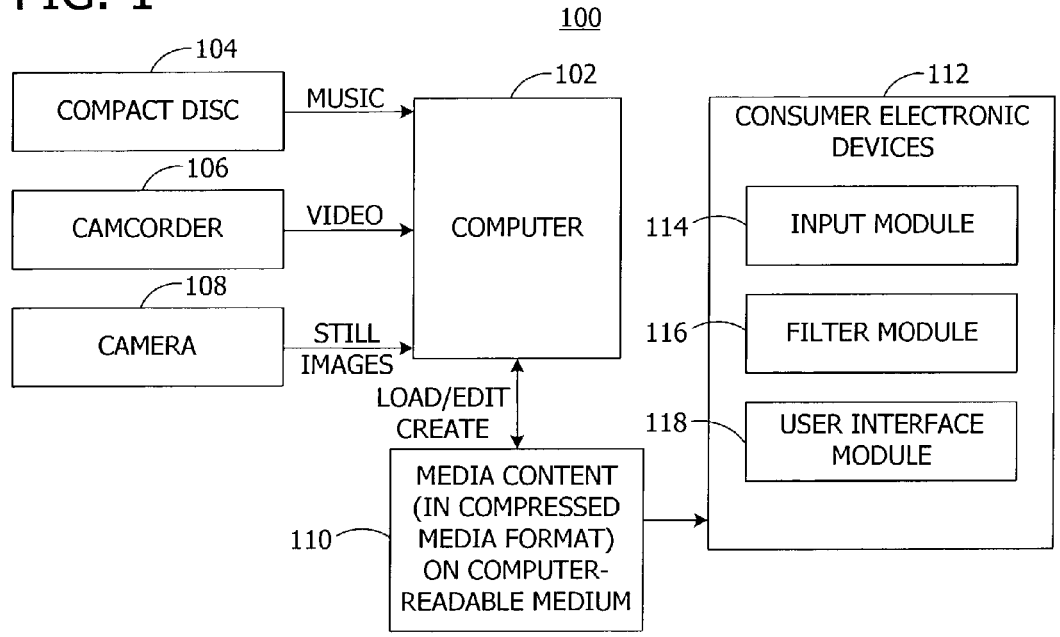
FIG. 1 is a block diagram illustrating one example of a suitable media environment in which the invention may be implemented.

FIG. A1 is an exemplary block diagram illustrating a data structure representing information about all the media files on a computer-readable medium.

FIG. A2 is an exemplary block diagram illustrating a data structure representing playlist files.

FIG. A3 is an exemplary block diagram illustrating a hierarchical menu structure.

FIG. A4 is an exemplary block diagram illustrating a data structure representing text metadata.

Corresponding reference characters indicate corresponding parts throughout the drawings.

DETAILED DESCRIPTION OF THE INVENTION

The invention uses accelerator files, accelerator data, memory optimizing data, or the like, to provide an improved media player experience at startup for a user by caching metadata information from one or more media files and playlists in a compact binary representation. The compact representation can be directly and easily manipulated by a relatively low power central processing unit (CPU) such as found in a typical portable CD player or DVD player. Memory optimizing data, also referred to herein as accelerator files, also provide a limited menu system that allows players to offer some PC-like functionality in terms of selecting what to show or play. For example, a menu might offer 'Album', 'Artist', 'Genre' selections leading to playlists grouped by the appropriate item. Alternatively, a menu might offer to show one of three sets of holiday photos stored on the disk.

Figure 2:
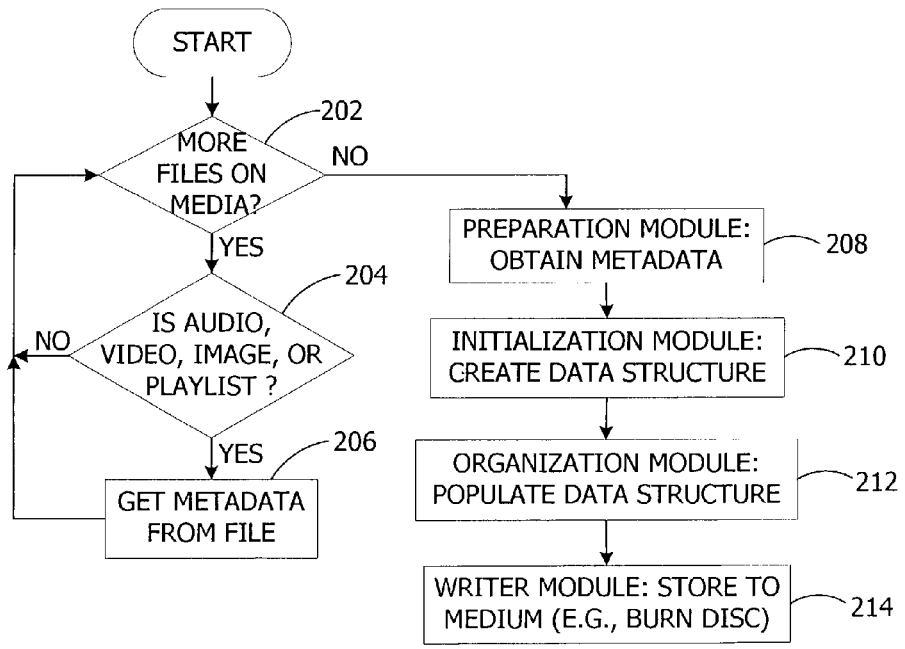
FIG. 2 is a flow chart illustrating exemplary operation of authoring software according to the invention.

The invention includes authoring software to create a data structure and to populate the created data structure with obtained metadata (see FIG. 2). The invention also includes rendering software to retrieve the metadata from the data structure and to identify media files to render (see FIG. 4). In one embodiment, the invention software is operable as part of a compressed media format (see FIG. 5) having a set of small files containing metadata, menus, and playlists in a compiled binary format designed for playback on feature-rich personal computer media players as well as low cost media players. For example, a typical low-end portable CD player might have as little as one hundred kilobytes of working memory, an eight-bit central processing unit running at only one megahertz and a very slow CD-drive mechanism with a maximum seek time of nearly five seconds.

Media Environment

Referring now to the drawings, FIG. 1 illustrates an exemplary multimedia environment in which the invention can be used. A system 100 has one or more computers 102 coupled to one or more devices providing media content. For example, the devices may include a CD 104, a camcorder 106, or a camera 108.

In one embodiment, the computer 102 stores media content on a computer-readable medium 110 for use by a media player program associated with a consumer electronic device 112. The consumer electronic device 112 includes any suitable rendering filter or media player or device that is configured to render digital media so that the user can experience the content that is embodied on the medium 110. For example, suitable media player applications include a CD media player and a DVD media player.

In the invention, the media players, consumer electronic devices 112, or the like may be organized into three exemplary levels according to the capabilities of the media player. Each media player has a media type that identifies the type of media that the media player is capable of rendering. For example, the media type (also referred to as a playlist summary type, a menu summary type, or the like) includes one or more of the following: audio, video, and still image. Level 1 media players include audio-only players such as portable CD players, car receivers, and DVD players. In addition to Level 1 media players, level 2 media players include audio and still image capable players including portable and set-top DVD players optionally capable of rendering images with audio simultaneously. Level 3 media players include level 2 media players and audio, still image, and video capable players. Exemplary consumer electronic devices 112 include, but are not limited to, the following: a portable CD player, an MP3 player, an audio system in an automobile, a personal digital assistant, a cellular telephone, or the like.

The software and data structures of the invention are operable in systems including, but not limited to, media players and media authoring systems. An exemplary consumer electronic device 112 or media player according to the invention has one or more computer-readable media storing computer-executable components for optimizing operation of the media player. The media player accesses a computer-readable medium to render media files stored on the medium. The computer-readable medium further stores memory optimizing data associated with the media files. The components of the media player include an input module 114 and a filter module 116. The input module 114 retrieves the memory optimizing data stored on the computer-readable medium prior to rendering the media files. The memory optimizing data is associated with one or more selected media files stored on the computer readable medium. The filter module 116 identifies the selected media files in response to the retrieved memory optimizing data from the input module 114. The selected media files are adapted to be rendered by the media player. In an embodiment in which the memory optimizing data includes text and binary data, the media player includes a user interface module 118 for displaying at least a portion of the text data in connection with the selected media files to which the memory optimizing data is associated during rendering of the selected media files. When memory optimizing data is not present on a medium, the media player offers sequential playback of the actual media files present on the medium.

Playlists

A playlist is a convenient way to organize groups of audio, video, and image files on a computer-readable medium. The playlist may include, but is not limited to, one or more of the following: a media file, a group of audio files, a group of video files, a group of timed image sequences, and a group of various complex parallel combinations of images with audio or optionally video. For example, a user may create playlists for different performers or different kinds of music or videos. The user also can manipulate the created playlists by shuffling or repeating the contents of the playlists. Playlists may exist in menus that allow the user to easily navigate and view a listing of the media files present on the medium and to select which playlists to render.

Authoring Software

Referring next to FIG. 2, authoring software of the invention creates and populates data structures to optimize operation of the media player. Proceeding from 202, for each input media file on an input medium, the authoring software determines at 204 if the input media file includes audio data, video data, image data, or a playlist. If the input media file includes such data, then metadata is obtained from the input media file for use in defining groups at 206. Metadata includes, but is not limited to, a playlist, a thumbnail image, a menu structure, or a language selection. If there are no more files on the input medium, as determined at 202, the authoring software obtains metadata at 208 for one or more selected media files. The metadata is obtained from sources such as the media files or from a server via a network such as the Internet. The authoring software creates a data structure adapted for accessing by the media player at 210 prior to rendering the media files and populates the created data structure at 212 with the obtained metadata. In addition, the authoring software stores the populated data structure at 214 on the computer-readable medium. In one embodiment, one or more computer-readable media have computer-executable instructions for performing the method illustrated in FIG. 2.

Figure 3:
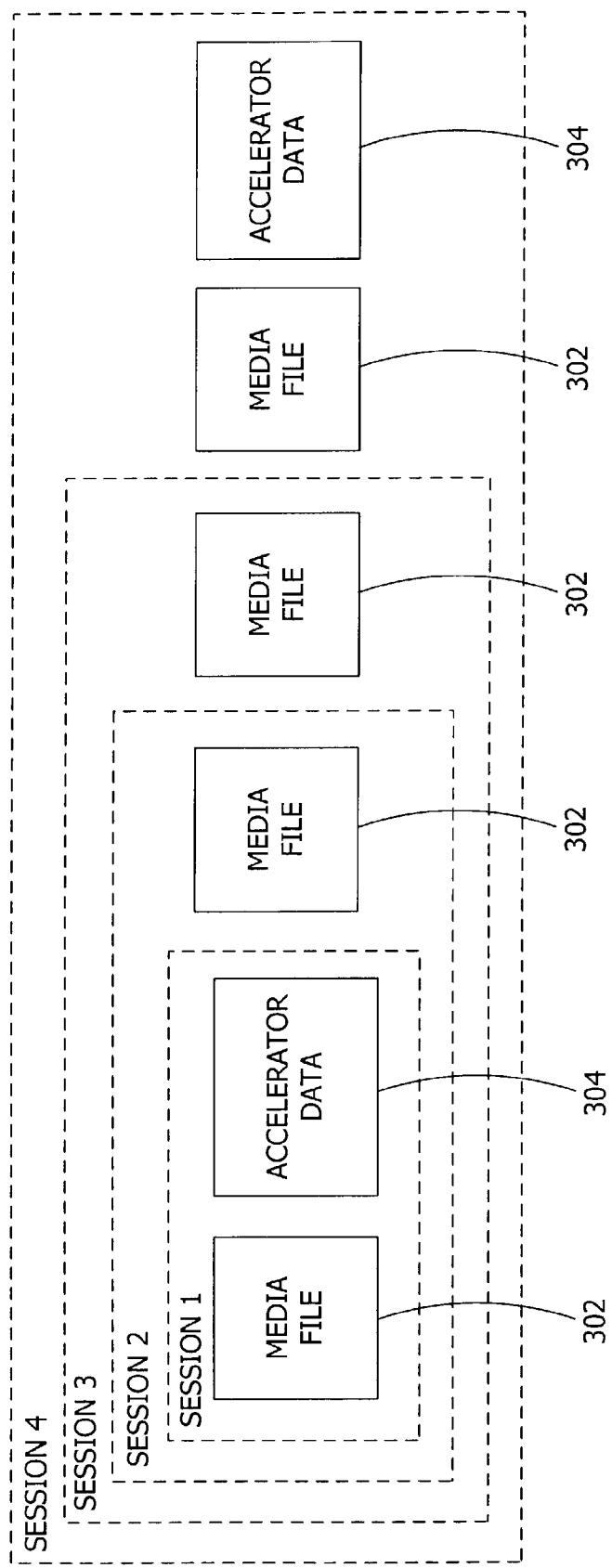
FIG. 3 is a flow chart illustrating a multi-session computer-readable medium.

In an embodiment with a multi-session computer-readable medium as illustrated in FIG. 3, the authoring software stores the populated data structure as the last session on the medium. In FIG. 3, media files 302 and acceleration data 304 are stored on a medium with four sessions (sessions 1, 2, 3, 4). Rendering software in the invention accesses the accelerator data 304 stored in session 4 (i.e., the last session on the medium).

If there is no memory optimizing data in the last session on the medium (not shown), then the rendering software ignores memory optimizing data in all sessions on the medium during rendering. This ensures that the memory optimizing data and the media files are coherent.

The authoring software performs additional functions to optimize memory. The authoring software associates numerical identifiers with the selected media files wherein the numerical identifiers are ordered sequentially. Each one of the numerical identifiers corresponds to a respective one of the media files. The authoring software references the numerical identifiers in the data structure instead of file names associated with the media files to reduce memory usage. In addition, the authoring software organizes the media files by directory and sorts the organized media files using the same algorithm as used by the file system on the medium (by file name) to facilitate searching the media files. Similarly, the authoring software determines a numerical identifier for each directory name in each path to one of the media files. The authoring software replaces the directory name with the determined numerical identifier. In one embodiment, the authoring software compresses or converts the media files to a supported format and compressor-decompressor (codec) if not already in a supported file format and codec. The compressed media files are also stored on the computer-readable medium.

The authoring software reads each user-supplied playlist in any common playlist format including, but not limited to, Moving Picture Experts Group-Layer 3 (MP3), Advanced Streaming Format (ASF or ASX), or WINDOWS brand operating system playlists (WPL) formats. Each playlist is converted to a numeric format using the numerical identifiers assigned as described above further optimizing memory usage during playback. The numeric playlists are also stored on the computer-readable medium.

The authoring software optionally creates thumbnails for each menu, playlist or media file. Large images are rendered as small thumbnails for menu display further optimizing memory and central processing unit (CPU) usage during navigation and playback of the media files on the medium. The thumbnails are also stored on the computer-readable medium allowing a language selection to be made at playback time.

In the embodiment of a media authoring tool, one or more computer-readable media have computer-executable components for optimizing operation of a media player. The components include a preparation module, an initialization module, an organization module, and a writer module. The preparation module obtains metadata for one or more selected media files. The initialization module creates a data structure adapted for accessing by the media player prior to rendering the media files. The organization module populates the created data structure from the initialization module with the obtained metadata from the preparation module. The writer module stores the populated data structure from the organization module on the computer-readable medium.

In one embodiment, the memory and disk-read optimization of the metadata cache is accomplished by separating the text and binary metadata into different cache files. This separation results in optimization because the text metadata is large and not required until playback of a specific playlist or media file begins. All of the binary metadata is contained in a single file (e.g., 'CONTENTS.HMT') while the text metadata is stored in a separate file (e.g., 'TEXT.HMT'). Another optimization is the actual layout of the binary metadata cache. The information in CONTENTS.HMT is organized into several sections (see FIG. A1 of Appendix A). Generally, the text and binary metadata are referred to as accelerator data, memory optimizing data, or the like.

Authoring software or disk creation software may store additional data on the disk in order that any previous user decisions about what to put in the menus can be preserved and re-presented when more data is added to the disk later. For example, if a user decides that there should be no menu option to display photos 'by month' then that choice could be persisted on the disk). Such persistence files may be application specific.

The accelerator files are split into two categories: ones that will probably be held totally or partially in memory all the time, and ones that are only loaded when needed (e.g., menus and playlists). The information within the accelerator files is organized in order of Audio data, Image data, and Video data to match the three levels of playback device allowed. In one embodiment, an audio-only player will not have to load in the part of the cache file that is for files that it is not capable of playing.

The information within the accelerator files is also divided into two categories: information that will probably be held totally or partially in memory all the time, and information that is only required during startup and can be discarded from memory during playback. For example, in the CONTENTS.HMT file, information is organized with the file names at the end of each file table (e.g., audio, menu image, image, and video as described below) because they can be discarded from memory once the process of matching the file names to the file system has been completed (assuming that the player chooses to do that on startup). The accelerator file may be further compacted in memory by the player by discarding items that are used only for checking the media files for compatibility. For example, once the bit rate and sample size of each audio file has been checked by the player, these are no longer required in memory.

By representing each media file as a unique number within all the other structures on the disk (menus and playlists) memory usage during playback is further minimized. In creating the cache file, the authoring software makes the conversion more efficient by sorting the files in the cache first by the directory that contains them then alphabetically or using the same algorithm as used by the file system on the medium (by file name). This is the same order as the file system records on an ISO 9660 Joliet medium, so the player can do a simple O(n) search algorithm instead of an O(n log n) or worse algorithm.

At the beginning of the cache file is a directory table where the text names for each directory are converted into a numeric identifier for that directory number. All references to directories are made via this table thus compacting all path names down to a compact numeric representation. Because each directory contains multiple files, this structure also represents an extremely compact way to represent the entire file and directory naming structure.

For example, File1 may be stored as '\DirA\DirB\DirC\File1' while File2 may be stored as '\DirA\DirB\DirD\File2.' To compact these directory paths, the following table replaces each directory component with a numerical identifier.

TABLE 1

| Directory Number | Name | Parent |
|---|---|---|
| 1 | \ | 0 |
| 2 | DirA | 1 |
| 3 | DirB | 2 |
| 4 | DirC | 3 |
| 5 | DirD | 3 |

The directory path to File1 may then be identified simply as '4' which can be traced back to generate a full path through directories 1-2-3-4, and the directory path to File2 may be identified simply as '5' which can be traced back to 1-2-3-5, resulting in memory savings.

In the invention, various means are used to ensure coherency between the metadata cache and the media content on the medium. For example, invention software ignores metadata cache files that are not in the last-session on the medium and verifies a unique random identifier that ties two of the files together.

Logical Sector Numbers for the Media Files

Another problem solved in CONTENTS.HMT is how to make it easy for a consumer electronic device to locate a specific file on a medium for playback. On a personal computer (PC), software simply looks up the file name in the file system cached in memory. A consumer electronic device may not have enough random access memory to hold the entire file system. As such, seeking/reading several blocks of the file system in order to locate a file on the medium is prohibitively slow. The most efficient way for the consumer electronic device to find the file is to store a logical sector number (LSN) of the file with the metadata. An optional accelerator file storing the LSN and file length for each file on the medium enables a rapid startup of playback and a lower memory requirement for the media player. The LSN accelerator file is optional, however, because not all implementations of authoring software may be able to determine the LSN and length of each file prior to writing the files. For example, authoring LSNs into the cache is not always possible for the PC which has a strictly layered architecture whereby the file system is isolated from the medium layout.

In addition, those offsets will be invalidated if a file is updated, moved or copied onto a different medium.

For authoring software that writes the medium in a single pass or which operates at an operating system level below the file system, the invention allows a special LSN cache file to be placed on the medium. The optional LSN cache file (e.g., accelerator file) storing the LSN and file length for each file on the medium enables rapid startup of playback. The LSN file contains the logical sector numbers for each file referenced by the accelerator files on the medium. The authoring software is able to determine the LSN and length of each file prior to writing the files. When this file is present in the last session on the medium, provided it matches the CONTENTS file (as verified by a unique, random generation number matched between the files), then the media player can use this file to locate every media file present on the medium and the player does not need to read or parse the file system to locate the media files.

Players will typically resolve the file names in the accelerator files to LSNs during startup, reading the entire file system to create a table in memory mapping file numbers to values for start LSN and byte length of each file. In one embodiment, the LSN cache file is created using a separate, manufacturer provided software that runs after the other accelerator files have been created. All players play media regardless of whether this additional acceleration file is present. Players with sufficiently fast drive mechanisms may avoid this startup procedure and simply resolve file names on a file-by-file basis during disk playback.

There are several issues around such a file including the fact that a file-copy of such a medium will likely result in an unplayable medium. Players that chose to implement such a file should check the validity of the data in the file before relying on it. If any LSN points to a file that does not appear to be on the medium, then the entire LSN file should be discarded and the player should revert to reading the file system to lookup LSNs and byte lengths for files. See Appendix A for an exemplary implementation of an LSN file according to the invention software.

Rendering Software

Figure 4:
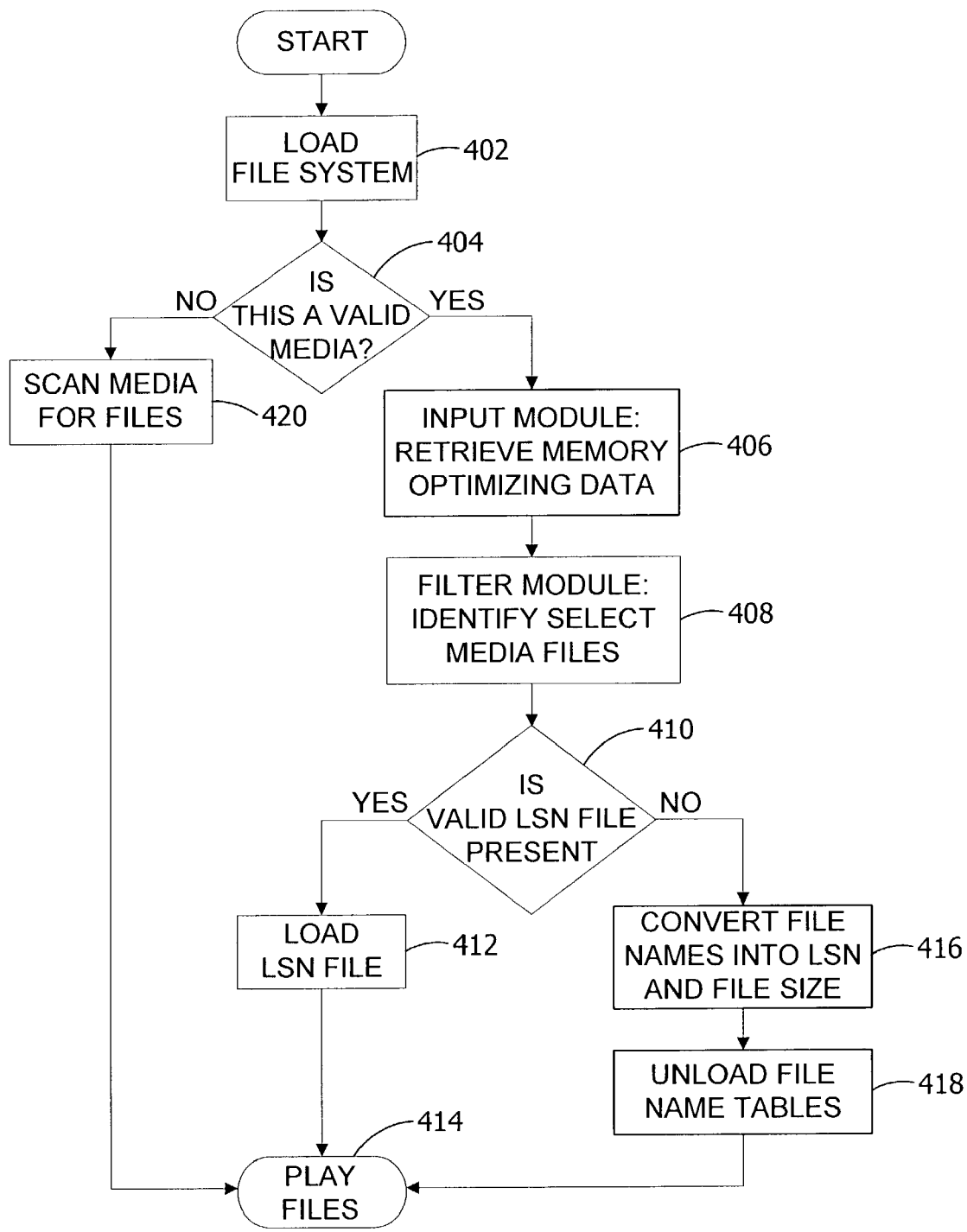
FIG. 4 is a flow chart illustrating exemplary operation of rendering software according to the invention.

Referring next to FIG. 4, rendering software optimizes operation of the media player. After loading the file system at 402, the rendering software determines at 404 if the input medium is a valid medium (e.g., a medium containing acclerator data). The rendering software retrieves the memory optimizing data stored on the computer-readable medium at 406 prior to rendering the media files. The memory optimizing data is associated with one or more selected media files stored on the computer readable medium. The rendering software identifies the selected media files at 408 in response to the retrieved memory optimizing data. The selected media files are adapted to be rendered by the media player. The selected media files may be a subset of a plurality of media files available on the computer-readable medium. In an embodiment in which the memory optimizing data includes text and binary data, the rendering software displays at least a portion of the text data by the media player in connection with the selected media files to which the memory optimizing data is associated during rendering of the selected media files. The rendering software obtains metadata associated with the selected media files via the memory optimizing data and displays the obtained metadata to a user on a display associated with the media player. In one embodiment, one or more computer-readable media have computer-executable instructions for performing the method illustrated in FIG. 4.

Players will typically resolve the file names in the accelerator files to LSNs during startup, reading the entire file system to create a table in memory mapping file numbers to values for start LSN and byte length of each file. Players with sufficiently fast drive mechanisms may avoid this startup procedure and simply resolve file names on a file-by-file basis during disk playback.

If a valid LSN file is present in the memory optimizing data at 410, the rendering software loads the LSN file and proceeds to render the selected media files at 414. When the special LSN cache file is not present or is not valid at 410, the player must read the file system to convert the file names in the CONTENTS file into LSNs at 416.

In this invention, each of the file tables in the CONTENTS file is organized as a list of binary metadata with offsets into the list of text file names that follow the binary metadata. This allows the player to load only the binary metadata into memory initially and then it can read the file names incrementally, discarding each block as it is processed. The file system can similarly be held in memory and matched incrementally against the file names in the CONTENTS file, or it can be read incrementally and processed against an in-memory copy of the CONTENTS file. A player with very little memory could even read both the CONTENTS file and the file system incrementally, although that might be rather slow.

As the file system is matched to the file names in the CONTENTS file, each four byte offset to the file name can be replaced with the LSN and the file name can then be discarded from memory. This invention thus efficiently reuses memory and minimizes the number of memory-memory copy operations that might otherwise be required to compact the data structures in memory after the file-name matching process is completed. Once the player has completed this phase of the startup process the entire file name table and file system can be discarded from memory at 416 and all that the player is left with is, in an exemplary embodiment, 32 bytes per audio file, 16 bytes per image file and 44 bytes per video file. The rendering software proceeds to render the selected media files at 414. Ultimately, once the startup phase is complete a single number can be used to refer to any media file and the player can easily access the binary and text metadata for that file and the LSN for that file from a very compact in-memory structure. The file length or size is stored in a separate field in the memory table.

If the input medium does not contain memory optimizing data at 404, the rendering software scans the input media for files at 420 and renders any files on the medium at 414.

Metadata and Menu Display

Media players with rendering software according to the invention display metadata information during playback. The rendering software of the invention has at least two ways to obtain metadata for display: (i) from the accelerator files and (ii) from the actual media files on the medium. In general, the actual media files will contain a greater variety of metadata than the minimal set of metadata contained in the accelerator file. Some media players may choose to expose this additional metadata, for example, showing lyrics, album, year or genre for music files or 'date taken' for still images. Media players display all alphabet, numeric characters, spaces and hyphens in metadata but may translate or omit other characters that they cannot display. For example, some character displays may not be able to display a full character set.

In one embodiment, media players that have an alphanumeric display should offer users the possibility to display at least the artist and title for music files during playback. Music files with no artist tag or no title tag are treated as if they had a null tag for that field. In one embodiment, media players scroll metadata instead of truncating the metadata. Media players may, however, truncate metadata to no less than 32 characters as memory requirements dictate.

The menu on an accelerated playback medium according to the invention software includes a single hierarchical structure of submenus and playlists. The menu tree may be arbitrarily deep and arbitrarily broad within an optional overall limit of 9,999 total nodes, for example. Other embodiments may implement other or different restrictions relating to the menu tree. Most media players will display the top-level menu when a medium is inserted. Car receivers, however, may choose to bypass the menu on startup and begin playback immediately with the first playlist on the medium or may resume playback on the song and playlist that was playing previously. In one embodiment, menus are filtered to display only those menu items that the player is capable of displaying or playing (e.g. an audio-only player will remove all image and video menu entries to display only pure-audio selections).

Rendering software in the invention can be implemented with various features. For example, because each menu may contain up to 9,999 entries, some media players may display a scrolling or paged view of the menu. TV-connected players may display a thumbnail menu or a simple list menu (e.g., based on whether entries such as playlists or menus within the current menu have thumbnails or not). In one embodiment, TV-connected players display a thumbnail menu only when a thumbnail is present (i.e. non-zero entry) for every entry in the current menu. The layout of thumbnails on the screen and the number of thumbnails displayed per page is player dependent. Some media players may choose to display a continuous scrolling list, others may choose to paginate the menu and offer next/previous selections. On a 4:3 TV set, media players display a grid of 3×2 thumbnails. On a 16:9 TV set, media players may choose to display a 4×2 grid instead. Players indicate a selection state of menu items. There are many choices for how this may be done, and depends on the capability of the player. In order to provide for a rich user experience, menu and playlist Items have a Selected State Thumbnail. Players capable of displaying thumbnails may use this thumbnail to indicate selection instead of other methods. Players also display the playlist or menu name with the associated thumbnail. In the event that the player cannot display all thumbnails instantaneously, the text labels are displayed first and the thumbnails added one by one as they are decoded. The player might allow scrolling to the next or previous page even while the thumbnails are being added in order to allow users to navigate quickly to a given item.

Menu display in the invention is player dependent; each manufacturer may decide how to display menus. On a portable CD player, for example, the menu might be displayed one line at a time with the Next, Previous, Play/Select and Stop buttons used to navigate through the choices. On a car receiver, playback might begin immediately with the first playlist on the medium. The user would then need to press a 'menu' key to bring up the medium menu and use Next, Previous and Play/Select to navigate through it. On a DVD player, a full graphical display might be shown complete with the optional thumbnails. Some DVD players may choose to number the menu items and use 1–9 keys on a remote control, while some may simply present the menu items in a list or a grid format and use cursor keys for navigation and selection.

Exemplary Media Content Environment

Figure 5:
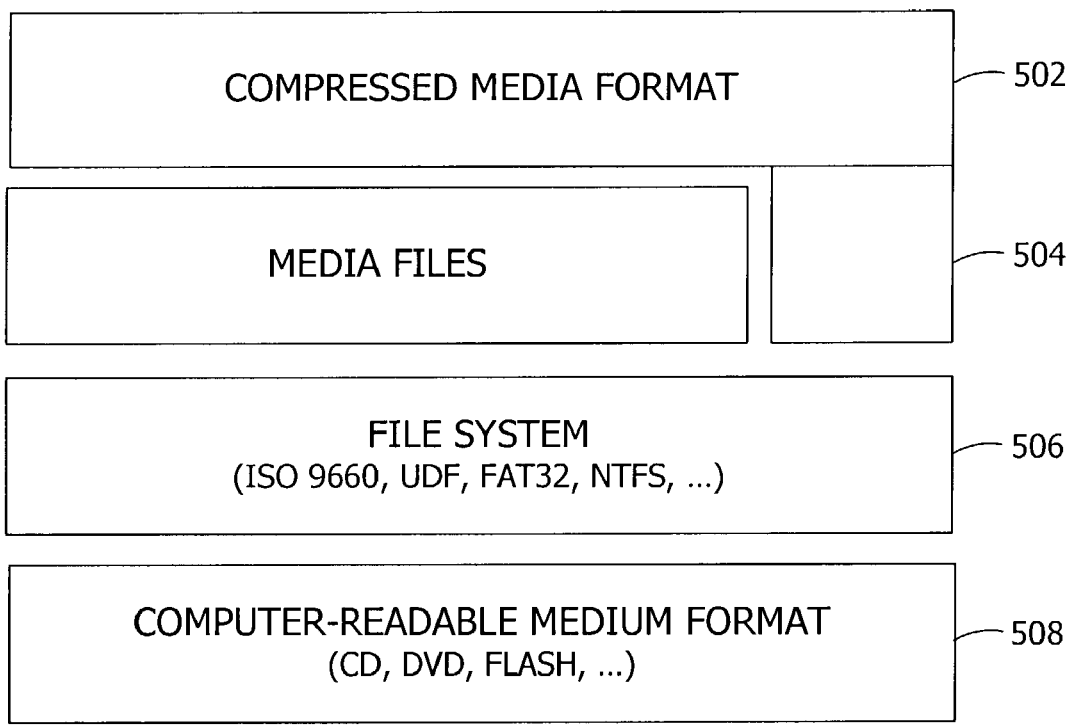
FIG. 5 is a block diagram illustrating an exemplary compressed media format for use with the invention software.

As illustrated in FIG. 5, the invention is operable as part of an exemplary compressed media format 502 having a set of small files 504 containing metadata, menus, and playlists in a compiled binary format designed for playback on feature-rich PC media players as well as low cost media players. The exemplary compressed media format of the invention encompasses audio, still images, and video media files 504 in various formats. The compressed media format for use with the invention defines a logical format for organizing compressed media files in a file system 506 on computer-readable media 508 such as optical discs (e.g., CD-ROM, CD-R, CD-RW, DVD-RAM, DVD-R, DVD-RW, DVD+RW, DVD+R, DVD-ROM), flash memory (e.g., COMPACTFLASH brand, secure digital, MEMORY STICK brand), magnetic media (e.g., hard disks), and the like.

Figure 6:
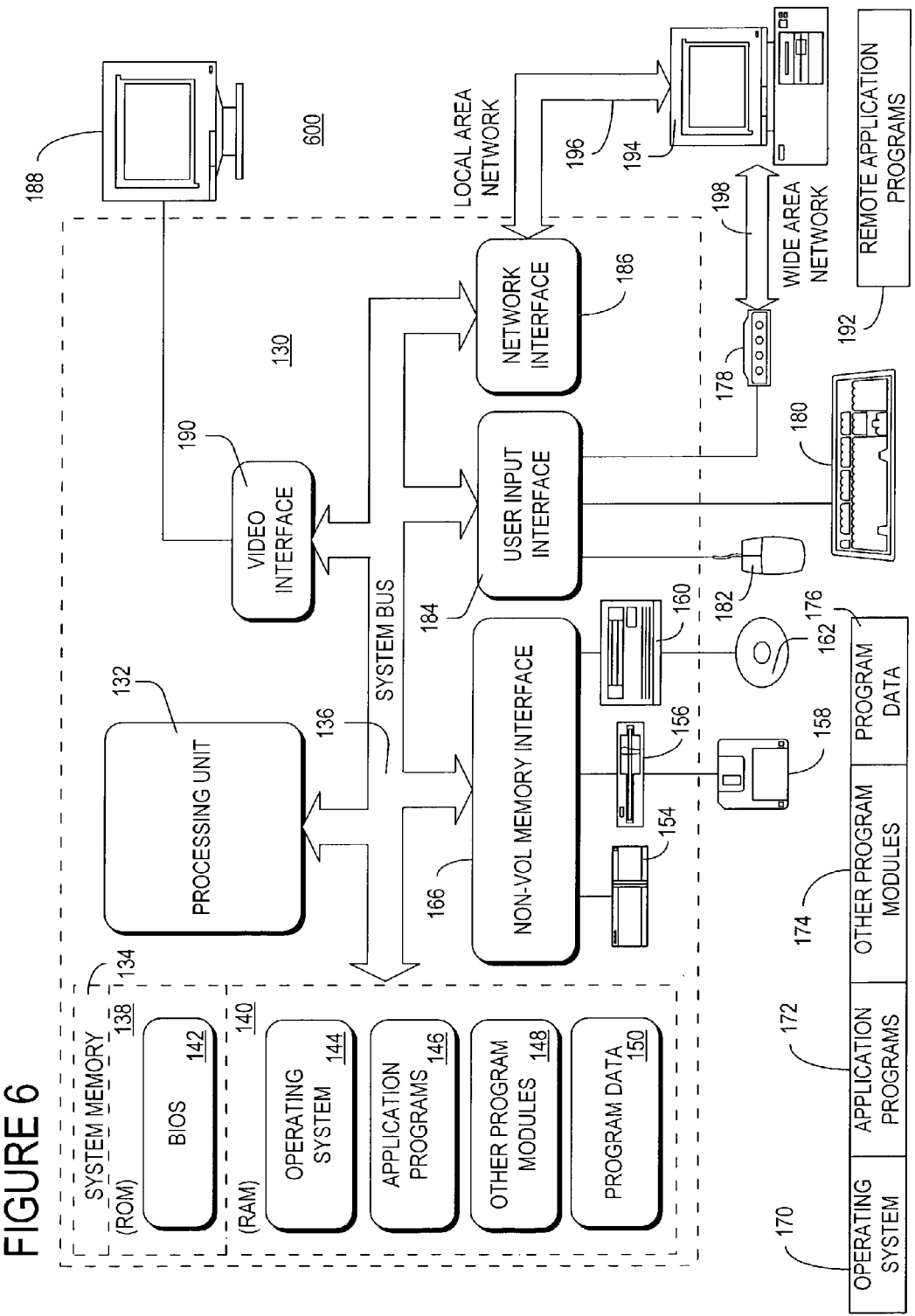
FIG. 6 is a block diagram illustrating one example of a suitable computing system environment in which the invention may be implemented.

FIG. 6 shows one example of a general purpose computing device in the form of a computer 130. In one embodiment of the invention, a computer such as the computer 130 is suitable for use in the other figures illustrated and described herein. Computer 130 has one or more processors or processing units 132 and a system memory 134. In the illustrated embodiment, a system bus 136 couples various system components including the system memory 134 to the processors 132. The bus 136 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 130 typically has at least some form of computer readable media. Computer readable media, which include both volatile and nonvolatile media, removable and non-removable media, may be any available medium that can be accessed by computer 130. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. For example, computer storage media include RAM, ROM, EEPROM, flash memory or other memory technology, CD-ROM, digital versatile discs (DVD) or other optical disc storage, magnetic cassettes, magnetic tape, magnetic disk storage or other magnetic storage devices, or any other medium that can be used to store the desired information and that can accessed by computer 130. Communication media typically embody computer readable instructions, data structures, program modules, or other data in a modulated data signal such as a carrier wave or other transport mechanism and include any information delivery media. Those skilled in the art are familiar with the modulated data signal, which has one or more of its characteristics set or changed in such a manner as to encode information in the signal. Wired media, such as a wired network or direct-wired connection, and wireless media, such as acoustic, RF, infrared, and other wireless media, are examples of communication media. Combinations of the any of the above are also included within the scope of computer readable media.

The system memory 134 includes computer storage media in the form of removable and/or non-removable, volatile and/or nonvolatile memory. In the illustrated embodiment, system memory 134 includes read only memory (ROM) 138 and random access memory (RAM) 140. A basic input/output system 142 (BIOS), containing the basic routines that help to transfer information between elements within computer 130, such as during start-up, is typically stored in ROM 138. RAM 140 typically contains data and/or program modules that are immediately accessible to and/or presently being operated on by processing unit 132. By way of example, and not limitation, FIG. 6 illustrates operating system 144, application programs 146, other program modules 148, and program data 150.

The computer 130 may also include other removable/non-removable, volatile/nonvolatile computer storage media. For example. FIG. 6 illustrates a hard disk drive 154 that reads from or writes to non-removable, nonvolatile magnetic media. FIG. 6 also shows a magnetic disk drive 156 that reads from or writes to a removable, nonvolatile magnetic disk 158, and an optical disc drive 160 that reads from or writes to a removeble, nonvolatile optical disc 162 such as a CD-ROM or other optical media. Other removable/non-removable, volatile/nonvolatile computer storage media that can be used in the exemplary operating environment include, but are not limited to, magnetic tape cassettes, flash memory cards, digital versatile discs, digital video tape, solid state RAM, solid state ROM, and the like. The hard disk drive 154, and magnetic disk drive 156 and optical disc drive 160 are typically connected to the system bus 136 by a non-volatile memory interface, such as interface 166.

The drives or other mass storage devices and their associated computer storage media discussed above and illustrated in FIG. 6, provide storage of computer readable instructions, data structures, program modules and other data for the computer 130. In FIG. 6, for example, hard disk drive 154 is illustrated as storing operating system 170, application programs 172, other program modules 174, and program data 176. Note that these components can either be the same as or different from operating system 144, application programs 146, other program modules 148, and program data 150. Operating system 170, application programs 172, other program modules 174, and program data 176 are given different numbers here to illustrate that, at a minimum, they are different copies.

A user may enter commands and information into computer 130 through input devices or user interface selection devices such as a keyboard 180 and a pointing device 182 (e.g., a mouse, trackball, pen, or touch pad). Other input devices (not shown) may include a microphone, joystick, game pad, satellite dish, scanner, or the like. These and other input devices are connected to processing unit 132 through a user input interface 184 that is coupled to system bus 136, but may be connected by other interface and bus structures, such as a parallel port, game port, or a Universal Serial Bus (USB). A monitor 188 or other type of display device is also connected to system bus 136 via an interface, such as a video interface 190. In addition to the monitor 188, computers often include other peripheral output devices (not shown) such as a printer and speakers, which may be connected through an output peripheral interface (not shown).

The computer 130 may operate in a networked environment using logical connections to one or more remote computers, such as a remote computer 194. The remote computer 194 may be a personal computer, a server, a router, a network PC, a peer device or other common network node, and typically includes many or all of the elements described above relative to computer 130. The logical connections depicted in FIG. 6 include a local area network (LAN) 196 and a wide area network (WAN) 198, but may also include other networks. Such networking environments are commonplace in offices, enterprise-wide computer networks, intranets, and global computer networks (e.g., the Internet).

When used in a local area networking environment, computer 130 is connected to the LAN 196 through a network interface or adapter 186. When used in a wide area networking environment, computer 130 typically includes a modem 178 or other means for establishing communications over the WAN 198, such as the Internet. The modem 178, which may be internal or external, is connected to system bus 136 via the user input interface 184, or other appropriate mechanism. In a networked environment, program modules depicted relative to computer 130, or portions thereof, may be stored in a remote memory storage device (not shown). By way of example, and not limitation, FIG. 6 illustrates remote application programs 192 as residing on the memory device. It will be appreciated that the network connections shown are exemplary and other means of establishing a communications link between the computers may be used.

Generally, the data processors of computer 130 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. The invention described herein includes these and other various types of computer-readable storage media when such media contain instructions or programs for implementing the steps described below in conjunction with a microprocessor or other data processor. The invention also includes the computer itself when programmed according to the methods and techniques described herein.

For purposes of illustration, programs and other executable program components, such as the operating system, are illustrated herein as discrete blocks. It is recognized, however, that such programs and components reside at various times in different storage components of the computer, and are executed by the data processor(s) of the computer.

Although described in connection with an exemplary computing system environment, including computer 130, the invention is operational with numerous other general purpose or special purpose computing system environments or configurations. The computing system environment is not intended to suggest any limitation as to the scope of use or functionality of the invention. Moreover, the computing system environment should not be interpreted as having any dependency or requirement relating to any one or combination of components illustrated in the exemplary operating environment. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, executed by one or more computers or other devices. Generally, program modules include, but are not limited to, routines, programs, objects, components, and data structures that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

In operation, computer 130 executes computer-executable instructions such as those illustrated in FIG. 2 to create a data structure and to populate the created data structure with obtained metadata. In addition, computer 130 (as part of a media player) executes computer-executable instructions such as those illustrated in FIG. 4 to retrieve the metadata from the data structure and to identify media files to render.

EXAMPLES

Figure 7:
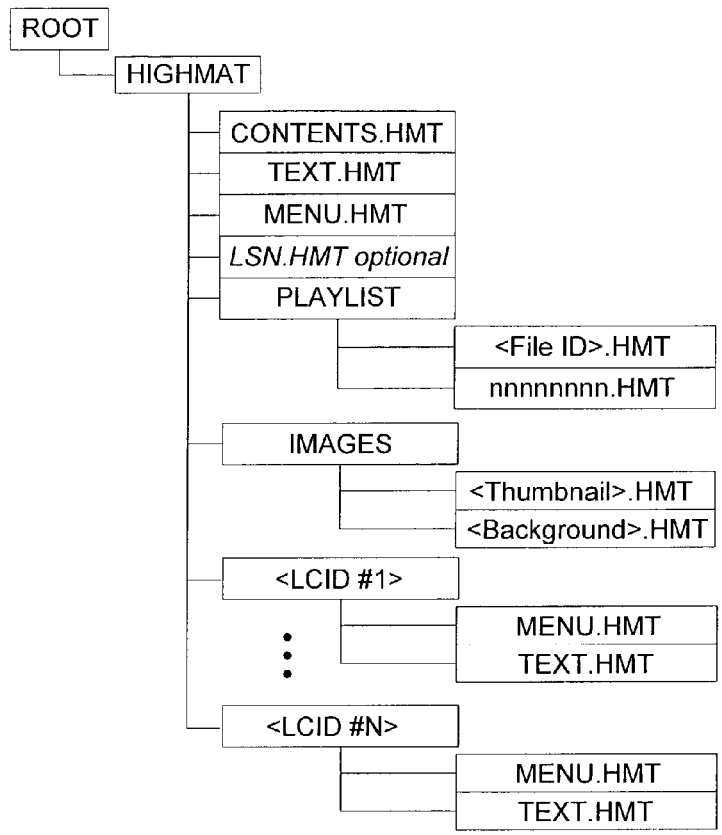
FIG. 7 is an exemplary block diagram illustrating a file system structure for the memory optimizing data.

In one embodiment, the accelerator files exist on the medium under a top-level directory called 'HIGHMAT' and includes the exemplary files illustrated in the file system shown in FIG. 7. The accelerator files exist on a medium under a top-level directory called 'HIGHMAT' and include the following files: CONTENTS.HMT, nnnnnnnn.HMT, MENU.HMT, and TEXT.HMT. The CONTENTS.HMT file contains information about all the media files present on the medium. It contains a directory table, followed by the file entry tables for each of the supported file types (Audio, Video, Image and Playlist). There is one file for each playlist on the medium called 'nnnnnnnn.HMT' where nnnnnnnn is a hexadecimal playlist file identifier. These playlist files are created in a 'PLAYLIST' subdirectory. The MENU.HMT file contains the menu structure. The TEXT.HMT file contains all the textual information needed during playback.

In alternative embodiment, the following files are included: <Thumbnail>.HMT and <Background>.HMT. There is one file for each thumbnail on the medium (e.g., 160×120 JPG format with .HMT extension). The authoring software may name the files as appropriate. The Thumbnail files are created in an 'IMAGES' subdirectory. There is one file for each menu background on the medium. Backgrounds with a 4:3 aspect ratio are in 640×480 JPG format with .HMT extension. Backgrounds with a 16:9 aspect ratio are in 852×480 JPG format with .HMT extension. The authoring software may name the files as appropriate. The Background files are created in the 'IMAGES' subdirectory.

The HIGHMAT directory and all of the files within it may be marked as hidden by the software that creates the medium in order to lessen user confusion. Players should handle media whether these files and directories are hidden or not. All of the binary structures should be encoded using Little Endian byte ordering. File and Directory names should use Big Endian byte ordering. When the player encounters an unknown value the default behavior should be to ignore the offending file. For example, if Playlist Summary Type is equal to 255, then the entire playlist should be skipped.

Multiple Languages

Figure 8:
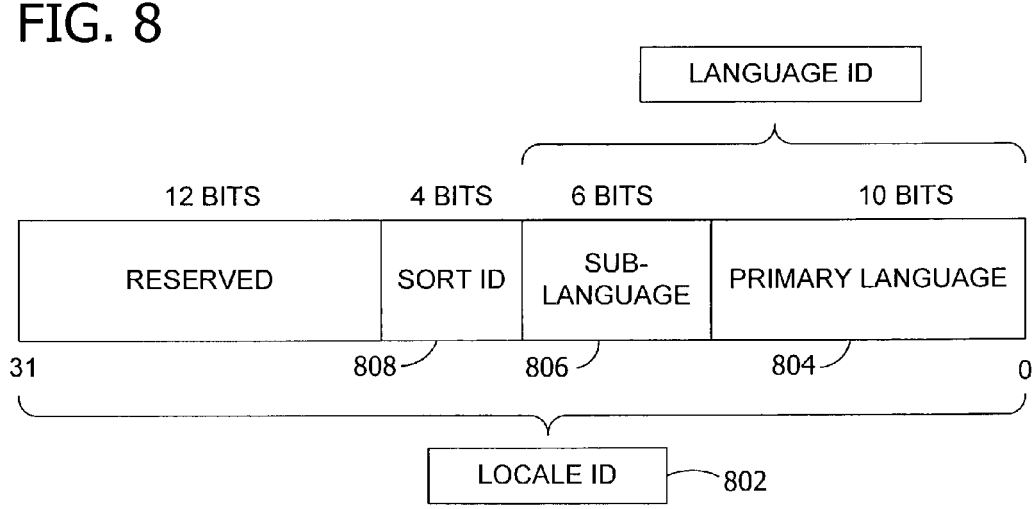
FIG. 8 is an exemplary block diagram illustrating a data structure representing locale information.

The invention software supports multiple languages of menu and text data on a single storage media. This is accomplished through the use of Locale Identifiers (LCID). The structure of an exemplary LCID 802 is illustrated in FIG. 8. As discussed in greater detail in Appendix A, the file headers of accelerator files (e.g., TEXT.HMT and MENU-.HMT) contain the LCID 802 that represents their language and they must match. CONTENTS.HMT contains a list of LCID's for the languages on this storage media.

The media players use the first item in the list of LCIDs 802 as the default language. If there is more than one language defined then the player should choose the LCID 802 to play from the list; (e.g., based on the language or locale of the media player). The player loads the corresponding TEXT.HMT and MENU.HMT by using a Directory Number for those files. The first (default) LCID 802 entry should have the Directory Number that is the location of CONTENTS.HMT; i.e. the default language MENU.HMT and TEXT.HMT is in the same directory as CONTENTS.HMT.

The LCID 802 itself has several parts: the first ten bits are the primary language ID 804, which contains the language itself. The next six bits contain the sublanguge ID 806, which is often used to differentiate regions that share the same primary language ID 804. The next four bits represent the sort ID 808, which can differentiate between alternate sorting orders that might be used for the same language and region. The remaining 12 bits are reserved for future use and should always be zero. For example, the LCIDs 802 may be stored in a file such as CONTENTS.HMT described in greater detail in Appendix A.

See Appendix A for additional detail regarding the exemplary structures of the accelerator files for use with the invention software.

When introducing elements of the present invention or the embodiment(s) thereof, the articles "a," "an," "the," and "said" are intended to mean that there are one or more of the elements. The terms "comprising," "including," and "having" are intended to be inclusive and mean that there may be additional elements other than the listed elements.

In view of the above, it will be seen that the several objects of the invention are achieved and other advantageous results attained.

As various changes could be made in the above constructions, products, and methods without departing from the scope of the invention, it is intended that all matter contained in the above description and shown in the accompanying drawings shall be interpreted as illustrative and not in a limiting sense.

Appendix A

Text Encoding

All text data is stored in UCS-2 Unicode format. All file and directory names should preserve the case as they are on the source media. Little-Endian byte order should be used for all of the word layouts specified except for directory and file names which should use Big-Endian word layout.

Order of Directory Name Sorting

The entries in the Directory Table should be sorted using the following criteria applied in order of significance:
1) In ascending order according to the relative value of the parent directory number.
2) If two directories have the same parent directory number then the names should be sorted using the following criteria in descending order of significance:
   2.1) If two directory names have the same value in all byte positions, then the two directories are equal in value.
   2.2) If two directory names do not contain the same number of byte positions, the shorter directory name should be padded on the right with all padding bytes set to (00) until both directory names contain the same number of byte positions.
   2.3) After adding any necessary padding to treat the directory names as equal length, starting with the first position of the directory names the byte values are compared until a byte position is found that does not contain the same value. The directory name with the higher code position value is the greater name.

Order of File Name Sorting

The entries in the File Name Tables should be sorted using the following criteria applied in order of significance:
3) In ascending order according to the relative value of the parent directory number.
4) If two files have the same parent directory number then the names should be sorted using the following criteria in descending order of significance:
2.1) If two file names have the same value in all byte positions, then the two files are equal in value.
2.2) If two file names do not contain the same number of byte positions, the shorter file name should be padded on the right with all padding bytes set to (00) until both file names contain the same number of byte positions.
2.3) After adding any necessary padding to treat the file names as equal length, starting with the first position of the file names the byte values are compared until a byte position is found that does not contain the same value. The file name with the higher code position value is the greater name.

Natural Language Sorting

On a Unicode volume, the 16-bit UCS-2 code points are used to determine the Order of Path Table Records and the Order of Directory Records. No attempt will be made to provide natural language sorting on the media. Natural language sorting may optionally be provided by a display application as desired.

CONTENTS.HMT

CONTENTS.HMT contains information about all the media files present on the disk. It contains a directory table, followed by the file entry tables for each of the supported file types (Audio, Video, Menu Image, Image and Playlist). This file is the main index that all of the other HIGHMAT files reference. Each file can be uniquely identified by the order that it is listed in CONTENTS.HMT. File numbers start at 1, and are sequential with no gaps.

Contents ID

Each entry in CONTENTS.HMT has a unique ID that is derived from its relative position in the file. The term Contents ID can be used as a reference to any of the file types. The ID's start at 1 and are sequential throughout the file with no gaps. CID is used as an abbreviation for Contents ID.

Playlist File ID

Playlist files are the first files in CONTENTS.HMT and if present should start with file ID 1.

Audio File ID

Audio files follow the list of Playlist files in CONTENTS.HMT. The starting file ID should be the Number of Playlist files as defined herein plus 1.

Thumbnail ID

Menu Image files follow the list of Audio files in CONTENTS.HMT. The starting file ID should be the Number of Playlist files as defined herein plus the Number of Audio files as defined herein plus 1.

Image File ID

Image files follow the list of Menu Image files in CONTENTS.HMT. The starting file ID should be the Number of Playlist files as defined herein plus the Number of Audio files as defined herein plus the Number of Menu Image files as defined herein plus 1.

Video File ID

Video files follow the list of Image files in CONTENTS.HMT. The starting file ID should be the Number of Playlist files as defined herein plus the Number of Audio files as defined herein plus the Number of Menu Image files as defined herein plus the Number of Image files as defined herein plus 1.

The file numbers are not stored in this file as they are easily derived by the location of the file information in CONTENTS.HMT. The number of files in each file entry table is stored in the CONTENTS.HMT header. These numbers can be used to identify where in the file to start enumerating to find the specific file reference. MENU.HMT, TEXT.HMT and nnnnnnnn.HMT files reference files by this unique number. This was done to save space in these files and not store the same information in multiple places. The grouping of like file types within CONTENTS.HMT allows players to ignore whole sections of the file if they do not handle that file type, e.g. an audio only player can discard everything after the audio section of CONTENTS.HMT. The directory table is designed to allow the compression of the path information contained in each of the many files.

Structure of CONTENTS.HMT File

The offsets in the accelerator files are byte offsets from the beginning of the file. The Audio, Menu Image, Image and Video file tables' should start on a 2K boundary. The directory table should be written after the file header including the LCID table with no extra padding.

FIG. A1 illustrates a data structure representing information about all the media files on a computer-readable medium.

File Header

If there are no files available of a given type the corresponding table should be empty this should be authored as both the number of files and the offset to the table being zero.

TABLE A1

| Offset | Length | Field Name |
| --- | --- | --- |
| | File manifest header | |
| 0 | 8 | Identifier |
| 8 | 2 | Version |
| 10 | 8 | HMT Generation |
| 18 | 4 | Size of CONTENTS.HMT |
| 22 | 4 | Number of Directories |
| 26 | 4 | Offset to Directory table |
| 30 | 4 | Number of Playlist Files |
| 34 | 2 | Size of playlist Entry |
| 36 | 4 | Offset to Playlist file table |
| 40 | 4 | Number of Audio files |
| 44 | 2 | Size of Audio Entry |
| 46 | 4 | Offset to Audio file table |
| 50 | 4 | Number of Menu Image files |
| 54 | 2 | Size of Menu Image Entry |
| 56 | 4 | Offset to Menu Image file table |
| 60 | 4 | Number of Image files |
| 64 | 2 | Size of Image Entry |
| 66 | 4 | Offset to Image file table |
| 70 | 4 | Number of Video files |
| 74 | 2 | Size of Video Entry |
| 76 | 4 | Offset to Video file table |
| 80 | 2 | Number of LCID entries |
| 82 | 4 | Directory Number 1 |
| 86 | 4 | LCID 1 |
| | ... | |

TABLE A1-continued

File manifest header

| Offset | Length | Field Name |
|---|---|---|
| 82 + 8*(n − 1) | 4 | Directory Number n |
| 86 + 8*(n − 1) | 4 | LCID n |

Identifier

This 8 byte entry contains "INFO_HMT" in ASCII.

Version

This 2 byte entry represents the version of the HMT specification used to author this file. For example version 1.20 would be stored as 0×78 (120 decimal)

HMT Generation

This 8 byte entry represents the generation of LSN.HMT that matches this CONTENTS.HMT. This CONTENTS.HMT should only be used with an LSN.HMT file that contains the same HMT Generation number. If the HMT Generation values do not match then the LSN.HMT file should be ignored by the player. A value of 0 means that there is no LSN.HMT file.

Size of CONTENTS.HMT

This 4 byte entry contains the size of CONTENTS.HMT in bytes.

Number of Directories

This 4 byte entry contains the number of directories in the directory table defined herein.

Offset to Directory Table

This 4 byte entry is the byte offset from the beginning of CONTENTS.HMT to the directory table.

Number of Playlist Files

This 4 byte entry contains the number of playlist files in the playlist file table defined herein. There should be at least one playlist file.

Size of Playlist Entry

This 2 byte entry is the size of a Playlist Entry in bytes.

Offset to Playlist File Table

This 4 byte entry is the byte offset from the beginning of CONTENTS.HMT to the playlist file table.

Number of Audio Files

This 4 byte entry contains the number of audio files in the audio file table defined herein.

Size of Audio Entry

This 2 byte entry is the size of an Audio File Entry in bytes as defined herein.

Offset to Audio File Table

This 4 byte entry is the byte offset from the beginning of CONTENTS.HMT to the audio file table. The offset should be a multiple of 2K, any gaps between the end of the Playlist File Table and the start of the Audio File Table should be ignored. A value of 0 indicates that there are no Audio Entries in CONTENTS.HMT—The number of Audio Files as defined herein should be 0 as well.

Number of Menu Image Files

This 4 byte entry contains the number of Menu Image files in the Menu Image file table defined herein Size of Menu Image Entry This 2 byte entry is the size of a Menu Image File Entry in bytes as defined herein.

Offset to Menu Image File Table

This 4 byte entry is the byte offset from the beginning of CONTENTS.HMT to the Menu Image file table. The offset should be a multiple of 2K, any gaps between the end of the Audio File Table and the start of the Menu Image File Table should be ignored. A value of 0 indicates that there are no Menu Image Entries in CONTENTS.HMT—The number of Menu Image Files as defined herein should be 0 as well.

Number of Image Files

This 4 byte entry contains the number of Image files in the Image file table defined herein.

Size of Image Entry

This 2 byte entry is the size of an Image File Entry in bytes as defined herein.

Offset to Image File Table

This 4 byte entry is the byte offset from the beginning of CONTENTS.HMT to the Image file table. The offset should be a multiple of 2K, any gaps between the end of the Menu Image File Table and the start of the Image File Table should be ignored. A value of 0 indicates that there are no Image Entries in CONTENTS.HMT—The number of Image Files as defined herein should be 0 as well.

Number of Video Files

This 4 byte entry contains the number of video files in the video file table defined herein.

Size of Video Entry

This 2 byte entry is the size of a Video File Entry in bytes as defined herein.

Offset to Video File Table

This 4 byte entry is the byte offset from the beginning of CONTENTS.HMT to the video file table. The offset should be a multiple of 2K, any gaps between the end of the Image File Table and the start of the Video File Table should be ignored. A value of 0 indicates that there are no Video Entries in CONTENTS.HMT—The number of Video Files as defined herein should be 0 as well.

Number of LCID Entries

This 2 byte entry represents the number of languages on this disk. This value must be at least 1.

Directory Number

This 4 byte entry is the index in the directory table as defined herein of the directory that contains the TEXT.HMT and MENU.HMT for this locale identifier. This should be either a subdirectory of HIGHMAT with the LCID as the directory name; however a reference to HIGHMAT itself is valid for the default language.

LCID n

This 4 byte entry represents the locale identifier.

Directory Table

The directory entries are numbered starting at 1, the offsets are at the beginning of the table to allow for easy direct indexing. The directory names should be terminated with a null UCS-2 character (two null bytes). The directory table should contain all of the directories on the disk that contain at least one file that is a valid JPG, HMT, MP3, ASF, WMA or WMV file.

The directory table should be formatted as follows:

TABLE A2

Directory entry format

| Length | Field Name |
|---|---|
| 4 | Parent Directory Number #1 |
| 4 | Offset to directory name length #1 |
| ... | |
| 4 | Parent Directory Number #n |
| 4 | Offset to directory name length #n |
| 2 | Directory name Length #1 |
| Variable | Directory name #1 |
| ... | |
| 2 | Directory name Length #n |
| Variable | Directory name #n |

The root directory should be stored in entry 1 with a parent entry of 0 (invalid entry number). The directory entries should be listed in sorted order as defined herein.

Parent Directory Number

This 4 byte entry is the index in the Directory Table for the parent directory. This value should be 0 for the first Directory Entry.

Offset to Directory Name Length

This 4 byte entry is the byte offset from the beginning of CONTENTS.HMT to the directory name length for this entry.

Directory Name Length

This 2 byte entry contains the byte length of the directory name excluding the ending null UCS-2 character (two null bytes).

Directory Name

This variable length entry is the UCS-2 name of the directory. The name should be terminated with a null UCS-2 character (two null bytes). The maximum length for this entry is 111 UCS-2 characters including the null UCS-2 character. This entry should use Big-Endian word layout.

Playlist File Table

The Playlist File Table includes a list of Playlist File Entries. There should be one Playlist File Entry for each Playlist File. No file name for the playlist file is stored because the file name for each playlist can be derived using the ID of the playlist file in CONTENTS.HMT as defined herein combined with the naming scheme. Each Playlist file entry should be formatted as follows:

TABLE A3

Playlist File Entry Format

| Offset | Length | Field Name |
|---|---|---|
| 0 | 4 | Directory Number |
| 4 | 1 | Playlist Summary Type (Audio, Image, Video) |
| 5 | 1 | reserved |

Directory Number

This 4 byte entry is the index in the directory table as defined herein of the directory that contains this file.

Playlist Summary Type

This value is the same as that stored in the header of the Playlist file corresponding to the Playlist File Entry.

Reserved

This 1 byte entry is reserved for future use.

Audio File Table

The Audio File Table includes a list of Audio File Entries followed by the File name table. There should be one Audio File Entry for each Audio File. Windows Media Audio files should have a .WMA extension, and MP3 files should have an .MP3 extension. All other file extensions are invalid. Putting the file name table after the Audio File Entries allows the player to discard the file name table from memory once the initial file name to LSN conversion has taken place, thereby keeping in memory only the actual data for playback of each file. The Audio File Entries should be listed in the sort order defined herein. Each Audio file entry should be formatted as follows:

TABLE A4

Audio File Entry Format

| Offset | Length | Field Name |
|---|---|---|
| 0 | 4 | Offset to Directory Number |
| 4 | 2 | File Type |
| 6 | 2 | Special Flags |
| 8 | 1 | Number of channels |
| 9 | 1 | Sample size (bit depth) |
| 10 | 4 | Average bit rate |
| 14 | 4 | File bit rate |
| 18 | 4 | Playing duration |
| 22 | 4 | Sampling freq. |
| 26 | 2 | Track Number |
| 28 | 4 | Thumbnail ID |

TABLE A5

File name table

| Offset | Length | Field Name |
|---|---|---|
| | 4 | Directory Number CID#p + 1 |
| | 2 | File Name Length CID#p + 1 |
| | Variable | File Name CID#p + 1 |
| | ... | |
| | 4 | Directory Number CID#n |
| | 2 | File Name Length CID#n |
| | Variable | File Name CID#n | p represents the number of playlist files
n–p represents the number of Audio Files Offset to Directory Number This 4 byte entry is the byte offset from the beginning of CONTENTS.HMT to the directory number for this entry.

File Type

This 2 byte entry represents the File type, which means the data encoding format. Only the values defined for Audio Files are valid for this entry.

TABLE A6

File Type

| File Type | Value |
|---|---|
| 0 | MP3 |
| 1 | WMA |
| 2–1023 | Reserved for Audio Files |
| 1024 | WMV |
| 1025 | MP4 optional |
| 1026–2047 | Reserved for Video Files |
| 2048 | JPG |

TABLE A6-continued

File Type

| File Type | Value |
|---|---|
| 2049 | Thumbnail |
| 2050 | Menu Background 4x3 (640x480) |
| 2051 | Menu Background 16x9 (852x480) |
| 2052–3071 | Reserved for Image Files |
| 3072–65535 | Reserved for future use |

Special Flags

This 2 byte entry summarizes the special attributes of this file. The special flags entry is created by logically OR'ing the following values together:

TABLE A7

Special Flags

| Special Flags | Value |
|---|---|
| 0000 0000 0000 0000$_b$ | NONE |
| xxxx xxxx xxxx xxx1$_b$ | DRM PROTECTED |
| xxxx xxxx xxxx x00x$_b$ | COPY FREE |
| xxxx xxxx xxxx x11x$_b$ | NO MORE COPIES |
| xxxx xxxx xxxx x10x$_b$ | COPY ONCE |
| All other values | RESERVED |

The Special flags entry allows players to filter files that they can play, e.g. a player that is not capable of playing protected content should exclude files marked as DRM protected.

Number of Channels

This 1 byte entry contains the number of channels of audio in this file.

Sample Size

This 1 byte entry contains the bit size per channel.

Average Bit Rate

This 4 byte entry contains the audio stream average bit rate in bits per second.

File Bit Rate

This 4 byte entry contains the total file bit rate in bits per second.

Playing Duration

This 4 byte entry contains the duration of this file in milliseconds.

Sampling Frequency

This 4 byte entry contains the sampling frequency in hertz.

Track Number

This 2 byte entry contains the track number of the audio file on the source media. A value of 0 indicates no track number.

Thumbnail ID

This 4 byte entry represents the Image File ID that is the thumbnail for this file in CONTENTS.HMT; if there is no thumbnail for this file then the value should be 0. This value can be used by authoring applications to prevent the regeneration of thumbnails.

Directory Number

This 4 byte entry is the index in the directory table as defined herein of the directory that contains this file.

File Name Length

This 2 byte entry contains the byte length of the file name excluding the ending null UCS-2 character (two null bytes).

File Name

This is the UCS-2 file name. The name should be terminated with a null UCS-2 character (two null bytes). The maximum length for this entry is 111 UCS-2 characters including the null UCS-2 character. This entry should use Big-Endian word layout.

Menu Image File Table

The Menu Image File Table is used to list all of the thumbnails and background images used in the MENU-.HMT file. All menu image files should have a .HMT extension; all other file extensions are invalid. The Menu Image File Table includes a list of Menu Image Entries followed by the File name table. There should be one Menu Image File Entry for each Menu Image File. The Menu Image File Entries should be listed in the sort order defined herein. Each Menu Image file entry should be formatted as follows:

TABLE A8

Menu Image File Entry Format

| Offset | Length | Field Name |
|---|---|---|
| 0 | 4 | Offset to Directory Number |
| 4 | 2 | File Type |
| 6 | 2 | Special Flags |

TABLE A9

File name table

| Offset | Length | Field Name |
|---|---|---|
|  | 4 | Directory Number CID#n + 1 |
|  | 2 | File Name Length CID#n + 1 |
|  | variable | File Name CID#n + 1 |
|  |  | . . . |
|  | 4 | Directory Number CID#m |
|  | 2 | File Name Length CID#m |
|  | variable | File Name CID#m |

* m–n represents the number of Menu Image files

Offset to Directory Number

This 4 byte entry is the byte offset from the beginning of CONTENTS.HMT to the directory number for entry.

File Type

This 2 byte entry represents the File type, which means the data encoding format. The only valid values as defined herein are: thumbnail, menu background (4x3) and menu background (16x9).

Special Flags

This 2 byte entry is defined herein.

Directory Number

This 4 byte entry is the index in the directory table as defined herein of the directory that contains this file.

File Name Length

This 2 byte entry contains the byte length of the file name excluding the ending null UCS-2 character (two null bytes).

File Name

This is the UCS-2 file name. The name should be terminated with a null UCS-2 character (two null bytes). The maximum length for this entry is 111 UCS-2 characters including the null UCS-2 character. This entry should use Big-Endian word layout.

Image File Table

The Image File Table includes a list of Image File Entries followed by the File name table. There should be one Image File Entry for each Image File. All image files should have either .JPG or .JPEG extension; all other file extensions are invalid. The Image File Entries should be listed in the sort order defined herein. Each Image file entry should be formatted as follows:

TABLE A10

Image File Entry Format

| Offset | Length | Field Name |
|---|---|---|
| 0 | 4 | Offset to Directory Number |
| 4 | 2 | File Type |
| 6 | 2 | Special Flags |
| 8 | 4 | Thumbnail ID |
| 12 | 2 | Vertical Size |
| 14 | 2 | Horizontal Size |

TABLE A11

File name table

| Offset | Length | Field Name |
|---|---|---|
|  | 4 | Directory Number CID#m + 1 |
|  | 2 | File Name Length CID#m + 1 |
|  | variable | File Name CID#m + 1 |
|  | ... |  |
|  | 4 | Directory Number CID#k |
|  | 2 | File Name Length CID#k |
|  | variable | File Name CID#k |

* m–k represents the number of Image files

Offset to Directory Number

This 4 byte entry is the byte offset from the beginning of CONTENTS.HMT to the directory number for this entry.

File Type

This 2 byte entry represents the File type, which means the data encoding format. Only the values defined herein for Image Files excluding thumbnail, menu background (4×3) and menu background (16×9) are valid.

Special Flags

This 2 byte entry is defined herein.

Thumbnail ID

This 4 byte entry represents the Image File ID that is the thumbnail for this file in CONTENTS.HMT; if there is no thumbnail for this image then the value should be 0. This value can be used by authoring applications to prevent the regeneration of thumbnails.

Vertical Size

This 2 byte entry represents the vertical size of the image in pixels.

Horizontal Size

This 2 byte entry represents the horizontal size of the image in pixels.

Directory Number

This 4 byte entry is the index in the directory table as defined herein of the directory that contains this file.

File Name Length

This 2 byte entry contains the byte length of the file name excluding the ending null UCS-2 character (two null bytes).

File Name

This is the UCS-2 file name. The name should be terminated with a null UCS-2 character (two null bytes). The maximum length for this entry is 111 UCS-2 characters including the null UCS-2 character. This entry should use Big-Endian word layout.

Video File Table

The Video File Table includes a list of Video File Entries followed by the File name table. There should be one Video File Entry for each Video File. The valid file extensions for Windows Media Video files are .WMV and .ASF; .WMV is the preferred extension. The valid file extension for the optional MP4 files should be .ASF. All other file extensions are invalid. Putting the file name table after the Video File Entries allows the player to discard the file name table from memory once the initial file name to LSN conversion has taken place, thereby keeping in memory only the actual data required for playback of each file. The Video File Entries should be listed in the sort order defined herein. Each Video file entry should be formatted as an Audio File Entry as defined herein followed by a Video Entry.

TABLE A12

Video File Entry Format

| Offset | Length | Field Name |
|---|---|---|
| 0 | 4 | Offset to Directory Number |
| 4 | 2 | File Type |
| 6 | 2 | Special Flags |
| 8 | 1 | Audio number of channels |
| 9 | 1 | Audio sample size |
| 10 | 4 | Audio average bit rate |
| 14 | 4 | File bit rate |
| 18 | 4 | Playing duration |
| 22 | 4 | Audio sampling frequency |
| 26 | 2 | Track Number |
| 28 | 4 | Thumbnail ID |
| 32 | 4 | Video average bit rate |
| 36 | 2 | Video V-size |
| 38 | 2 | Video H-size |
| 40 | 4 | Frame rate |

TABLE A13

File name table

| Offset | Length | Field Name |
|---|---|---|
|  | 4 | Directory Number CID#k + 1 |
|  | 2 | File Name Length CID#k + 1 |
|  | Variable | File Name CID#k + 1 |
|  | ... |  |
|  | 4 | Directory Number CID#q |
|  | 2 | File Name Length#q |
|  | Variable | File Name CID#q |

* q–k represents the number of Video Files

File Type

This 2 byte entry represents the File type, which means the data encoding format. Only the values defined herein for Video Files are valid for this entry.

Video Average Bit-Rate

This 4 byte entry contains the average bit rate in bits per second.

Video Vertical Size

This 2 byte entry contains the vertical size of the video file in pixels.

Video Horizontal Size

This 2 byte entry contains the horizontal size of the video file in pixels.

Frame Rate

This field should contain the frame rate, like 30/1.001 (NTSC), 25(PAL) etc. in 4 bytes. This field should be described as (first 2 bytes Integer)/(last 2 bytes Integer). The value should be 0 if the authoring application is unable to determine the frame rate. Authoring applications should use the Least Common Multiple form to represent the frame rate. For Example: 3000/1001 instead of 30000/10010 for NTSC.

Directory Number

This 4 byte entry is the index in the directory table as defined herein of the directory that contains this file.

File Name Length

This 2 byte entry contains the byte length of the file name excluding the ending null UCS-2 character (two null bytes).

File Name

This is the UCS-2 file name. The name should be terminated with a null UCS-2 character (two null bytes). The maximum length for this entry is 111 UCS-2 characters including the null UCS-2 character. This entry should use Big-Endian word layout.

Playlist Files

Each playlist is represented as a unique nnnnnnnn.HMT file, where nnnnnnnn is a hexadecimal number that represents the Playlist File ID in CONTENTS.HMT as defined herein. These playlist files should be created in a subdirectory \HIGHMAT\PLAYLIST. There are four different types of playlist groups—they are: Audio (A), Video (V), Timed Image (TI) and Parallel Image Audio (PIA). The specific structure of each group is outlined below. Level 1 players should only play Audio groups.

Structure of nnnnnnnn.HMT File

FIG. A2 illustrates a data structure representing playlist files. The Playlist File includes a Playlist Header followed by one or more Playlist Groups. The file should be written such that there are no gaps between the data structures in the file.

TABLE A14

Playlist Header

| Offset | Length | Field Name |
|---|---|---|
| 0 | 8 | Identifier |
| 8 | 2 | Version |
| 10 | 4 | Size of Playlist File |
| 14 | 1 | Playlist Summary Type (Audio, Image, Video) |
| 15 | 1 | Repeat Count |
| 16 | 4 | Thumbnail ID |
| 20 | 4 | Number of Groups |
| 24 | 2 | Special Flags |

TABLE A15

One or More Groups

| | |
|---|---|
| 4 | Offset of next Group (0 if last group) |
| 4 | Offset of previous Group (0 if first group) |
| 4 | Group Number |
| 1 | Type of Playlist Group (A, V, TI, PIA) |
| 1 | Reserved |
| Variable | Group data |

Identifier

This 8 byte entry contains "PLISTHMT" in ASCII.

Version

This 2 byte entry represents the version of the HMT specification used to author this file. For example version 1.20 would be stored as 0×78 (120 decimal)

Size of Playlist File

This 4 byte entry contains the size of this Playlist File in bytes.

Playlist Summary Type

This 1 byte entry summarizes the types of all the individual playlists entries contained within it. The summary type is created by logically OR'ing the following values together:

TABLE A16

Playlist Summary Type

| Playlist Type | Value |
|---|---|
| $00000000_b$ | INVALID |
| $00000001_b$ | AUDIO FILES ARE PRESENT PIA SHOULD NOT SET THIS |
| $00000010_b$ | VIDEO FILES ARE PRESENT |
| $00000100_b$ | IMAGE FILES ARE PRESENT |
| All other values | Reserved |

PIA Playlists should only be summarized as an TI playlist and therefore should not set the Audio Files Are Present bit. The Playlist Summary Type allows players to filter the list of playlists to show only the playlists that they can play, e.g. an audio-only player can exclude all playlists that contain images or video.

Repeat Count

This 1 byte entry is the number of times to repeat the playback of this playlist. If this playlist is invoked with a starting point as defined herein then each repetition finishes with the file immediately preceding the starting point. A value of 0 indicates an infinite repeat count. For example, given three groups: Group A, Group B and Group C and a Repeat Count of 2 the playback order is A→B→C→A→B→C→Finish. For the same three groups with a Starting Group Index of 2 as defined herein the playback order is B→C→A→B→C→A. Players may ignore repeat count when playing back in conjunction with other user-playback modes.

Thumbnail ID

This 4 byte entry represents the index of the Thumbnail for this playlist in CONTENTS.HMT; if there is no thumbnail for this playlist then the value should be 0.

Number of Groups

This 4 byte entry represents the count of Playlist Groups.

Special Flags

This 2 byte entry summarizes the special attributes of this file. The special flags entry is created by logically OR'ing the following values together:

TABLE A17

Special Flags

| Special Flags | Value |
|---|---|
| 0000 0000 0000 0000$_b$ | NONE |
| xxxx xxxx xxxx xxx1$_b$ | SEQUENTIAL PLAY ONLY |
| All other values | RESERVED |

Offset of Next Group

This 4 byte entry is the offset from the beginning of nnnnnnnn.HMT to the next playlist group. This entry should be 0 if it is the last playlist group.

Offset of Previous Group

This 4 byte entry is the offset from the beginning of nnnnnnnn.HMT to the previous playlist group. This entry should be 0 if it is the first playlist group.

Group Number

This 4 byte entry is the number of this group; the group number can be used to lookup the group name in TEXT.HMT. Group numbers are sequential starting at 1 and are unique for all groups in all playlists.

Type of Playlist Group

This 1 byte entry represents the Playlist type defined as follows:

TABLE A18

Playlist Group Type

| Playlist Type | Value |
|---|---|
| 0 | Audio (A) |
| 1 | Video (V) |
| 2 | Timed Image (TI) |
| 3 | Parallel Image Audio (PIA) |
| 4–255 | Reserved |

The format of the group data for each of these playlist group types is defined in the following sections. Level 2 players are not required to play type 3 (PIA) as the added complexity of a parallel decoding path for images during audio playback is beyond the capabilities of some of the likely hardware available in the near term. Players not capable of playing type 3 should nevertheless give a good experience when presented with such playlist entries. A PIA sequence should be rendered as a Timed Image sequence (ignoring the audio).

Reserved

This 1 byte entry is reserved for future use.

Group Data

This represents the place in the format where the actual playlist group data is. The format of each playlist group is defined below.

Audio Playlist Group

TABLE A19

Audio Playlist Group (A)

| Offset | Length | Field Name |
|---|---|---|
| 0 | 4 | Number of Audio Files |
| 4 | 4 | Audio File ID 1 |
| 8 | 4 | Starting Point of Audio 1 |
| 12 | 4 | Ending Point of Audio 1 |
| 16 | 8 | Starting Point Offset 1 |
| 24 | 8 | Ending Point Offset 1 |
| ... | | ... |
| 4 + 28*(n − 1) | 4 | Audio File ID n |
| 8 + 28*(n − 1) | 4 | Starting Point of Audio n |
| 12 + 28*(n − 1) | 4 | Ending Point of Audio n |
| 16 + 28*(n − 1) | 8 | Starting Point Offset n |
| 24 + 28*(n − 1) | 8 | Ending Point Offset n |

Number of Audio Files

This 4 byte entry represents the number of Audio file ID's that are listed in this group.

Audio File ID

There is one 4 byte entry for each Audio file in this group. The value is the index of the Audio file in CONTENTS.HMT as defined herein.

Starting point of Audio

There is one 4 byte entry for each Audio file in this group. The value is the offset in milliseconds to the starting point of playback.

Ending point of Audio

There is one 4 byte entry for each Audio file in this group. The value is the offset in milliseconds to the ending point of playback. A value of 0 indicates play to the end of the file. The player should recognize the case where two sequential files have the same File ID and the Ending point of the first file and the starting point of the next file are equal, then playback should continue uninterrupted.

Starting Point Offset

There is one 8 byte entry for each Audio file in this group. The value is the offset from the beginning of the Audio file to the location a player may use to start reading the file. This offset is to be used with the Starting point of Audio field herein. If the Starting point of Audio field is 0 then this field should be 0 in which case the player will locate the first packet to read by examining the file header. If the Starting point of Audio field is non-zero then this field should be set by the Authoring software to the nearest location in the file to start decoding in order to quickly reach the Audio starting time. Players may ignore this field and only use the Starting point of Audio field herein. On CD media the high order 4 bytes should always be 0.

Ending Point Offset

There is one 8 byte entry for each Audio file in this group. The value is the offset from the beginning of the Audio file to the location a player may use to stop reading the file. This offset is to be used with the Ending point of Audio field herein. If the Ending point of Audio field is 0 then this field should be 0 in which case the player will need to decide for itself where to stop reading the file. If the Ending point of Audio field is non-zero then this field should be set by the Authoring software to the nearest location in the file to end reading in order to ensure all necessary data has been read.

Players may ignore this field and only use the Ending point of Audio field herein. On CD media the high order 4 bytes should always be 0.

In another embodiment, the Audio Playlist Group in Table A19 includes only the following fields: Number of Audio Files and Audio File ID 1 through Audio File ID n. The starting and ending points of audio and offsets for each audio file in the group are omitted.

Video Playlist Group

TABLE A20

Video Playlist Group (V)

| Offset | Length | Field Name |
| --- | --- | --- |
| 0 | 4 | Number of Video Files |
| 4 | 4 | Video File ID 1 |
| 8 | 4 | Starting Point of Video 1 |
| 12 | 4 | Ending Point of Video 1 |
| 16 | 8 | Starting Point Offset 1 |
| 24 | 8 | Ending Point Offset 1 |
| ... | | |
| 4 + 28*(n − 1) | 4 | Video File ID n |
| 8 + 28*(n − 1) | 4 | Starting Point of Video n |
| 12 + 28*(n − 1) | 4 | Ending Point of Video n |
| 16 + 28*(n − 1) | 8 | Starting Point Offset n |
| 24 + 28*(n − 1) | 8 | Ending Point Offset n |

Players may automatically resize the video to fill the display.

Number of Video Files

This 4 bytes entry represents the number of Video file ID's that are listed in this Video Playlist Group.

Video File ID

There is one 4 byte entry for each Video file in this group. The value is the index of the Video file in CONTENTS.HMT as defined herein.

Starting Point of Video

There is one 4 byte entry for each Video file in this group. The value is the offset in milliseconds to the starting point of playback. The value should be set to an I-frame.

Ending Point of Video

There is one 4 byte entry for each Video file in this group. The value is the offset in milliseconds to the ending point of playback. A value of 0 indicates play to the end of the file. The player should recognize the case where two sequential files have the same File ID and the Ending point of the first file and the starting point of the next file are equal, then playback should continue uninterrupted.

Starting Point Offset

There is one 8 byte entry for each Video file in this group. The value is the offset from the beginning of the Video file to the location a player may use to start reading the file. This offset is to be used with the Starting point of Video field herein. If the Starting point of Video field is 0 then this field should be 0 in which case the player will locate the first packet to read by examining the file header. If the Starting point of Video field is non-zero then this field should be set by the Authoring software to the nearest location in the file to start decoding in order to quickly reach the Video starting time.

Players may ignore this field and only use the Starting point of Video field herein. On CD media the high order 4 bytes should always be 0.

Ending Point Offset

There is one 8 byte entry for each Video file in this group. The value is the offset from the beginning of the Video file to the location a player may use to stop reading the file. This offset is to be used with the Ending point of Audio field herein. If the Ending point of Video field is 0 then this field should be 0 in which case the player will need to decide for itself where to stop reading the file. If the Ending point of Video field is non-zero then this field should be set by the Authoring software to the nearest location in the file to end reading in order to ensure all necessary data has been read. Players may ignore this field and only use the Ending point of Video field herein. On CD media the high order 4 bytes should always be 0.

Timed Image Group

TABLE A21

Timed Image Group (TI)

| Offset | Length | Field Name |
| --- | --- | --- |
| 0 | 4 | Number of Image Files |
| 4 | 2 | Initial Transition |
| 6 | 2 | Final Transition |
| 8 | 4 | Image File ID 1 |
| 12 | 4 | Duration 1 |
| 16 | 2 | Transition 1 |
| ... | | |
| 8 + 10*(n − 1) | 4 | Image File ID n |
| 12 + 10*(n − 1) | 4 | Duration n |
| 16 + 10*(n − 1) | 2 | Transition n |

Number of Image Files

This 4 bytes entry represents the number of Image file ID's that are listed in this group.

Initial Transition

This 2 byte entry defines the initial transition to be used to display the first image in the playlist. The only allowed values are CUT and FADE IN as defined herein.

Final Transition

This 2 byte entry defines the Final transition to be used to end the display the last image in the playlist. The only allowed values are CUT and FADE OUT as defined herein.

Image File

There is on 4 byte entry for each Image file in this group. The value is the index of the Image file in CONTENTS.HMT as defined herein.

Duration

This 4 byte entry represents the duration to display the image in milliseconds; a value of 0 represents infinity. The minimum image duration in a Timed Image Playlist Group is 5 seconds (5000 seconds).

Transition

This 2 byte entry defines the type of transition to use when the player changes to the next image. A value of 0 is defined as CUT and should be supported; support for all other value is optional. The list of transitions is defined as follows:

TABLE A22

Transition Type

| Type of Entry | Value |
| --- | --- |
| 0 | CUT |
| 1 | FADE IN / FADE OUT |
| 2 | DISSOLVE |

TABLE A22-continued

Transition Type

| Type of Entry | Value |
| --- | --- |
| 3 | WIPE FROM TOP |
| 4 | WIPE FROM BOTTOM |
| 5 | WIPE FROM LEFT |
| 6 | WIPE FROM RIGHT |
| 7 | WIPE DIAGONAL LEFT |
| 8 | WIPE DIAGONAL RIGHT |
| 9–65,535 | RESERVED |

The duration of the transition is manufacturer defined. The transition duration should not affect the image duration defined above. For example, a transition of 2 seconds duration between images of durations 20 and 30 seconds respectively should result in 19 seconds of the first image followed by 2 seconds of transition between the images followed by 29 seconds of the second image. For Timed Image Groups contained in PIA playlist groups the duration information should be respected by the player.

Parallel Image Audio Playlist Group

When implementing the next/previous playlist item function, players should step through the Timed Image Playlist Group. The player should synchronize the Audio to the next/previous image.

TABLE A23

Parallel Image Audio Playlist Group (PIA)

| Length | Field Name |
| --- | --- |
| 4 | Offset of Audio Playlist Group |
| variable | Timed Image Playlist Group (TI) |
| variable | Audio Playlist Group (A) |

Offset of Audio Playlist Group

This 4 byte entry is the offset from the beginning of nnnnnnnn.HMT to the Audio playlist group inside the PIA entry.

Timed Image Playlist Group

This entry is the Timed Image group as defined herein.

Audio Playlist Entry

This entry is the Audio entry as defined herein.

MENU.HMT

Structure of MENU.HMT File

FIG. A3 illustrates a hierarchical menu structure. The file should be written such that there are no gaps between the data structures in the file.

Menu File Header

TABLE A24

Menu File Header

| Offset | Length | Field Name |
| --- | --- | --- |
| 0 | 8 | Identifier |
| 8 | 2 | Version |
| 10 | 4 | Size of MENU.HMT |
| 14 | 4 | LCID |
| 18 | 2 | Offset of first menu |
| 20 | 2 | Menu Title Length |
| 22 | Variable | Menu Title |

Identifier

This 8 byte entry contains "MENU_HMT" in ASCII.

Version

This 2 byte entry represents the version of the HMT specification used to author this file. For example version 1.20 would be stored as 0x78 (120 decimal)

Size of MENU.HMT

This 4 byte entry contains the size of MENU.HMT in bytes.

LCID

This 4 byte entry is the Language ID of this MENU.HMT file.

Offset of First Menu

This 2 byte entry is the byte offset from the beginning of the MENU.HMT to the first Menu Header as defined herein.

Menu Title Length

This 2 byte entry contains the byte length of the menu title excluding the ending null UCS-2 character (two null bytes).

Menu Title

This is the UCS-2 Menu Title. The title should be terminated with a null UCS-2 character (two null bytes). The maximum length for this entry is 65 UCS-2 characters including the null UCS-2 character. Players should use this to display a title for the entire menu. An empty string (one NULL character) indicates that there is no title to display or that the authoring software has rendered the title onto the background image. For example: "My Hawaii Vacation", "2002 School Party".

Menu

Menus support either a background image, solid background color or player default behavior. If a background image or background color is defined then the text color should be defined. If the background image, background color and text color entries are 0 then the player should use its default behavior. Each Sub-Menu should be referenced by a single parent menu forming a strict hierarchical menu structure.

TABLE A25

Menu Header

| Offset | Length | Field Name |
| --- | --- | --- |
|  | 4 | Size of Menu Header |
|  | 4 | Offset to Parent Menu |
|  | 4 | Background Image ID (4:3) |
|  | 4 | Background Image ID (16:9) |
|  | 4 | Background Color |
|  | 4 | Text Color |
|  | 2 | Number of Items |
|  | 2 | Menu Subtitle Length |
|  | Variable | Menu Subtitle |
|  | Variable | Menu or Playlist Item #1 |
|  |  | ... |
|  | Variable | Menu or Playlist Item #n |

*n represents the number of menu items

Size of Menu Header

This 4 byte entry is the of the Menu Header including the Menu and Playlist Items in bytes.

Offset to Parent Menu

This 4 byte entry is the offset from the beginning of MENU.HMT to the Parent Menu—this value is 0 if this is the top level menu.

Background Image ID (4:3)

This 4 byte entry defines the image to display as the background of this menu on a 4:3 display. The image should be a 640×480 JPG file with an HMT extension. A value of 0 indicates there is no background image. The value is the index of the Menu Image file in CONTENTS.HMT as defined herein. Players should display the background image centered on the display preserving the aspect ratio. Players should use the background color if any defined herein to fill in any uncovered area.

Background Image ID (16:9)

This 4 byte entry defines the image to display as the background of this menu on a 16:9 display. The image should be a 852×480 JPG file with an HMT extension. A value of 0 indicates there is no background image. If this value is non zero then there should be a valid Background Image ID (4:3) as well. The value is the index of the Menu Image file in CONTENTS.HMT as defined herein. Players should display the background image centered on the display preserving the aspect ratio.

Background Color

This 4 byte entry defines the background color that should be used when this menu is rendered on the display. It is formatted as an RGB value with the following byte order: 0xFFRRGGBB. If a Background Image ID is defined herein then the background color should only be visible on areas of the display not covered by the background image if any. A value of 0 indicates there is no background color. If a player is not capable of color rendering then this field may be ignored.

Text Color

This 4 byte entry defines the color that the text on this menu should be rendered on the display. It is formatted as an RGB value with the following byte order: 0xFFRRGGBB. If a Background Image ID or Background Color is defined herein then this entry should contain a non zero value. A value of 0 is defined to mean that the player should use its default behavior. If a player is not capable of color rendering then this field may be ignored.

Number of Items

This 2 byte entry defines the number of Submenu or Playlist Items in this menu.

Menu Subtitle Length

This 2 byte entry contains the byte length of the menu subtitle excluding the ending null UCS-2 character (two null bytes).

Menu Subtitle

This is the UCS-2 Menu Subtitle. The subtitle should be terminated with a null UCS-2 character (two null bytes). The maximum length for this entry is 65 UCS-2 characters including the null UCS-2 character. Players should use this to display a subtitle for this menu. An empty string (one NULL character) indicates that there is no subtitle to display or that the authoring software has rendered the title onto the background image.

Menu or Playlist Item

This variable sized entry is either a Menu item as defined herein or a Playlist Item as defined herein.

Menu Item

TABLE A26

| Menu Item | | |
|---|---|---|
| Offset | Length | Field Name |
| 0 | 1 | Type of entry |
| 1 | 1 | Menu Summary Type |
| 2 | 4 | Thumbnail ID (0 if no thumbnail) |
| 6 | 4 | Selected State Thumbnail ID |
| 10 | 4 | Offset to Menu |
| 14 | 2 | Menu Name Length |
| 16 | Variable | Menu Name |

Type of Entry

This 1 byte entry defines whether this is a menu or playlist item structure. For the menu item this value should be the value of MENU as defined below.

TABLE A27

| Type of Entry | |
|---|---|
| Type of Entry | Value |
| 0 | UNUSED |
| 1 | MENU |
| 2 | PLAYLIST |
| 3-255 | RESERVED |

Menu Summary Type

This value is used to define the type of playlists that are accessible via this menu item.

Thumbnail ID

This 4 byte entry represents the Thumbnail ID for this menu item in CONTENTS.HMT as defined herein; if there is no thumbnail for this menu item then the value should be 0.

Selected State Thumbnail ID

This 4 byte entry defines the Thumbnail ID that represents the selected state for this menu item in CONTENTS.HMT as defined herein. A value of 0 indicates that the player should generate a bounding rectangle or other highlight to indicate selection using the color defined herein.

Offset to Menu

This 4 byte entry defines the byte offset from the beginning of MENU.HMT to the Menu as defined herein.

Menu Name Length

This 2 byte entry contains the byte length of the menu name excluding the ending null UCS-2 character (two null bytes).

Menu Name

This is the UCS-2 name of the Menu. The name should be terminated with a null UCS-2 character (two null bytes). The maximum length for this entry is 65 UCS-2 characters including the null UCS-2 character.

Playlist Item

TABLE A28

Playlist Item

| Offset | Length | Field Name |
|---|---|---|
| 0 | 1 | Type of entry |
| 1 | 1 | Playlist Summary Type |
| 2 | 4 | Thumbnail ID (0 if no thumbnail) |
| 6 | 4 | Selected State Thumbnail ID |
| 10 | 4 | Playlist ID |
| 14 | 4 | Starting Group Index |
| 18 | 4 | Starting File Index |
| 22 | 2 | Playlist Name in Menu Length |
| 24 | Variable | Playlist Name in Menu |

Type of Entry

This 1 byte entry defines whether this is a menu or playlist item structure as defined herein. For the playlist item this value should be the value of PLAYLIST as defined herein.

Playlist Summary Type

This value is used to define the type of playlist that this menu item references.

Thumbnail ID

This 4 byte entry defines the Thumbnail ID for this menu item in CONTENTS.HMT as defined herein. If there is no thumbnail for this menu item then the value should be 0. The thumbnail ID may be the same as the thumbnail ID in the playlist header as defined herein.

Selected State Thumbnail ID

This 4 byte entry defines the Thumbnail ID that represents the selected state for this menu item in CONTENTS.HMT as defined herein. A value of 0 indicates that the player should generate a bounding rectangle or other highlight to indicate selection using the color defined herein.

Playlist ID

This 4 byte entry defines the ID of the playlist for this menu item in CONTENTS.HMT as defined herein.

Starting Group Index

This 4 byte entry defines the index of the Group in the playlist file to start playback. A value of 1 indicates the first group in the playlist.

Starting File Index

This 4 byte entry defines the index of the File in the group referenced herein to start playback. A value of 1 indicates the first file in the group. Note: This value should be 1 if the Group referenced herein is a Parallel playlist group (PIA). The Starting Group Index and Starting File Index together allow one playlist to be referenced multiple times in the menu. For example: A menu could show thumbnails for every image on the disk and each thumbnail would take you to a looping playlist of all images beginning with the selected image.

Playlist Name in Menu Length

This 2 byte entry contains the byte length of the playlist name in menu excluding the ending null UCS-2 character (two null bytes).

Playlist Name in Menu

This is the UCS-2 name of the Playlist as it appears in the Menu. The name should be terminated with a null UCS-2 character (two null bytes). The maximum length for this entry is 65 UCS-2 characters including the null UCS-2 character.

TEXT.HMT File

The mapping of metadata to the fields in TEXT.HMT is outlined in the following table.

TABLE A29

|  | Audio Files | Image Files | Video Files | Playlist Files |
|---|---|---|---|---|
| Text1 | Audio Title | Image Title | Video Title | Playlist Name |
| Text2 | Artist Name | Creating Device Name (DSC Name) | Artist Name | None |
| Text3 | Composer Name | Date Image Taken | Created Date | None |
| Text4 | Album Name | Album Name | Album Name | None |
| Text5 | Genre Name | Genre Name | Genre Name | Genre Name |
| Group | None | None | None | Group Name |
| Extra Text | Lyrics | Note (Comment) | Note (Comment) | None |
| Lyrics |  |  |  |  |
| Copyright | Copyright | Copyright | Copyright | None |
| Album Artist | Album Artist | None | None | None |

Structure of TEXT.HMT File

FIG. A4 illustrates a data structure representing text metadata. The file should be written such that there are no gaps between the data structures in the file.

Header Section

TABLE A30

Text File Information Format

| Offset | Length | Field Name |
|---|---|---|
| 0 | 8 | Identifier |
| 8 | 2 | Version |
| 10 | 4 | File size |
| 14 | 4 | Number of Contents Text Entries |
| 18 | 4 | Number of Group Text Entries |
| 22 | 4 | Number of Extra Text Entries |
| 26 | 4 | Offset of contents text entries |
| 30 | 4 | Offset of group text entries |
| 34 | 4 | Offset of extra text entries |
| 38 | 4 | LCID |
| 42 | 2 | Disk Name Length |
| 44 | Variable | Disk Name |

Identifier

This field should be "TEXT_HMT" by ASCII in 8 bytes.

Version

This 2 byte entry represents the version of the HMT specification used to author version 1.20 would be stored as 0×78 (120 decimal)

File Size

This field should contain the size of this TEXT.HMT file in 4 bytes.

Number of Contents Entries

This 4 byte entry defines the number of Contents Text Entries at the offset defined herein.

Number of Group Entries

This 4 byte entry defines the number of Group Text Entries at the offset defined herein.

Number of Extra Text Entries

This 4 byte entry defines the number of Extra Text Entries at the offset defined herein.

Offset of Contents Text Entries

This 4 byte entry is the offset from the beginning of TEXT.HMT to the Contents text entry table.

Offset of Group Text Entries

This 4 byte entry is the offset from the beginning of TEXT.HMT to the Group text entry table.

Offset of Extra Text Entries

This 4 byte entry is the offset from the beginning of TEXT.HMT to the Extra text entry table.

LCID

This 4 byte entry is the Language ID of this MENU.HMT file.

Disk Name Length

This 2 byte entry contains the byte length of the disk name excluding the ending null UCS-2 character (two null bytes).

Disk Name

This variable length entry represents the name of the disk. The Disk Name is UCS-2 and should be terminated with a null UCS-2 character (two null bytes). The maximum length for this entry is 65 UCS-2 characters including the null UCS-2 character.

Text Entry

All of the text items are stored using the following format:

TABLE A31

Text Entry

| Offset | Length | Field Name |
|---|---|---|
| 0 | 2 | Length |
| 2 | Variable | Text |

Length

This 2 byte entry contains the byte length of the text excluding the ending null UCS-2 character (two null bytes).

Text

This is the UCS-2 Text Entry. The text should be terminated with a null UCS-2 character (two null bytes). The maximum length for text entries is as follows.

TABLE A32

Text Length

| Type of Text Data | Maximum Length |
|---|---|
| Group Name | 65 |
| Extra Text Entries | 32,767 |
| All Other | 1,024 |

The length is defined as UCS-2 characters and includes the ending Null UCS-2 character.

Contents Text Entry Table

The Contents text entry Table includes a list of Contents Text Entries. There should be one Contents Text Entry for each file in CONTENTS.HMT (Playlist, Audio, Menu Image, Image and Video) in the same order as the files are listed in CONTENTS.HMT.

TABLE A33

Contents Text Entry

| Offset | Length | Field Name |
|---|---|---|
| 0 | 4 | Contents ID |
| 4 | 4 | Offset of Text1 entry |
| 8 | 4 | Offset of Text2 entry |
| 12 | 4 | Offset of Text3 entry |
| 16 | 4 | Offset of Text4 entry |
| 20 | 4 | Offset of Text5 entry |
| 24 | 4 | Offset of extra text entry |

Contents ID

This 4 bytes entry represents of Contents ID for this Contents text entry as defined herein.

Offset of Text1 Entry

This 4 bytes entry represents the offset from the beginning of TEXT.HMT for first byte of Text1 entry as defined herein. It is required that each contents item in CONTENTS.HMT has a Text1 entry.

Offset of Text2 Entry

This 4 bytes entry represents the offset from the beginning of TEXT.HMT for first byte of Text2 entry as defined herein. If the contents item does not have Text2 data then this entry should be 0.

Offset of Text3 Entry

This 4 bytes entry represents the offset from the beginning of TEXT.HMT for first byte of Text3 entry as defined herein. If the contents item does not have Text3 data then this entry should be 0.

Offset of Text4 Entry

This 4 bytes entry represents the offset from the beginning of TEXT.HMT for first byte of Text4 entry as defined herein. If the contents item does not have Text4 data then this entry should be 0.

Offset of Text5 Entry

This 4 bytes entry represents the offset from the beginning of TEXT.HMT for first byte of Text5 entry as defined herein. If the contents item does not have Text5 data then this entry should be 0.

Offset of Extra Text Entry

This 4 bytes entry represents the offset from the beginning of TEXT.HMT for first byte of Extra text entry. If the contents item does not have Extra text data then this entry should be 0.

Group Text Entry Table

The Group text entry Table includes a list of Group Text Entries. There should be one Group Text Entry for each group in the playlist files listed in CONTENTS.HMT. The entries should be in the ascending group number order.

TABLE A34

Group Text Entry Format

| Offset | Length | Field Name |
|---|---|---|
| 0 | 4 | Group number |
| 4 | 4 | Offset of group name text entry |

Group Number

This 4 bytes entry represents the Group number for this Group text entry.

Offset of Group Name Text Entry

This 4 bytes entry represents the offset from the beginning of TEXT.HMT for first byte of Group name text entry as defined herein. It is required that each group has a name.

Extra Text Entry Table

The extra text entry table is defined as zero or more Extra Text Entries as defined herein. The entries should be stored in ascending Contents ID order. If there are zero Extra Text Entries the Number of Extra Text Entries field, the Base offset of Extra Text Entries, and the Base offset of Extra Text Data should all be 0.

TABLE A35

Extra Text Entry

| Offset | Length | Field Name |
|---|---|---|
| 0 | 4 | Contents ID |
| 4 | 1 | Number of Extra text data |
| 5 | 1 | Reserved |
| 6 | 2 | Type of 1st text data |
| 8 | 4 | Offset of 1st text entry |
| ... | | |
| 6 + 6*(n − 1) | 2 | Type of n-th text data |
| 8 + 6*(n − 1) | 4 | Offset of n-th text entry |

Contents ID

This 4 bytes entry represents of Contents ID of the file associated with this Extra text entry in CONTENTS.HMT as defined herein.

Number of Extra Text Data

This 1 byte entry represents of number of Extra text data associated by this Extra text entry.

Reserved

This 1 byte entry reserved for future use.

Type of n-th Text Data

This 2 byte entry contains one of the values defined in the table below.

TABLE A36

Type of n-th Text Data

| Extra Text Type | Value |
|---|---|
| 0 | UNUSED |
| 1 | LYRICS |
| 2 | COPYRIGHT |
| 3 | ALBUM ARTIST |
| 4–65,535 | RESERVED |

Offset of n-th Text Entry

This 4 bytes entry represents the offset from the beginning of TEXT.HMT for first byte of each Extra text entry as defined herein.

LSN File Header

TABLE A37

File header

| Offset | Length | Field Name |
|---|---|---|
| 0 | 8 | Identifier |
| 8 | 2 | Version |
| 10 | 8 | HMT Generation |
| 18 | 4 | Size of LSN.HMT |
| 22 | 4 | Number of LSN Entries (n) |
| 26 | 4 | LSN for CID #1 |
| 30 | 4 | File Size for CID #1 |
| ... | | |
| 26 + 8*(n − 1) | 4 | LSN for CID #n |
| 30 + 8*(n − 1) | 4 | File Size for CID #n |

Identifier

This 8 byte entry contains "LSN_HMT" in ASCII.

Version

This 2 byte entry represents the version of the HMT specification used to author this file. For example version 1.20 would be stored as 0×78 (120 decimal)

HMT Generation

This 8 byte entry represents the generation of the HMT files that matches this LSN.HMT. This LSN.HMT should only be used with a CONTENTS.HMT file that contains the same HMT Generation number. Authoring software should generate a unique random value to ensure that two files don't accidentally match.

Size of LSN.HMT

This 4 byte entry contains the size of LSN.HMT in bytes.

Number of LSN Entries

This 4 byte entry contains the number of entries that are defined in LSN.HMT.

LSN

This 4 byte entry contains the logical sector number for the item in CONTENTS.HMT with the same index.

File Size

This 4 byte entry contains the file size in bytes for the item in CONTENTS.HMT with the same index.

What is claimed is:

1. A method of optimizing operation of a media player, said media player accessing a computer-readable medium for rendering media files stored thereon, said computer-readable medium further storing memory optimizing data associated with the media files, said method comprising:

obtaining metadata including binary data and text data for one or more selected media files, wherein the binary data includes a reference to a location of each of the selected media files on the computer-readable medium, and wherein the text data describes content associated with each of the selected media files;

creating a data structure accessible by the media player prior to rendering the selected media files;

populating the created data structure with said obtained metadata including the binary data and the text data; and storing the populated data structure in the last session of a plurality of sessions on the computer-readable medium with the selected media files, wherein the media player accesses the stored data structure to present the text data to a user and to navigate and render the media files via the reference.

2. The method of claim 1, further comprising:

associating numerical identifiers with the selected media files, said numerical identifiers being ordered sequentially and each corresponding to a respective one of the selected media files; and storing said numerical identifiers in the data structure.

3. The method of claim 1, wherein the selected media files comprise a playlist or a menu image file or both.

4. The method of claim 1, further comprising:

organizing the selected media files by directory; and sorting the organized media files, wherein said organizing and said sorting facilitate searching the selected media files.

5. The method of claim 1, wherein said obtaining comprises obtaining metadata directly from the selected media files or from a network server via a data communication network, or both.

6. The method of claim 1, wherein obtaining comprises generating a playlist referencing one or more of the selected media files.

7. The method of claim 1, wherein the selected media files are each associated with a directory name, and further comprising:

determining a numerical identifier for each directory name; and populating the data structure with the determined numerical identifier.

8. The method of claim 1, further comprising:

compressing the selected media files; and wherein the media files are compressed before storing on the computer-readable medium.

9. The method of claim 1, wherein said obtaining comprises identifying a logical sector number for each of the selected media files.

10. The method of claim 1, wherein said obtaining comprises obtaining menu information identifying the selected media files.

11. The method of claim 1, wherein said obtaining comprises obtaining a thumbnail image corresponding to one or more of the selected media files.

12. The method of claim 1, wherein said obtaining comprises creating a playlist identifying one or more of the selected media files.

13. The method of claim 1, wherein said obtaining comprises identifying a language corresponding to menu information associated with the selected media files.

14. The method of claim 1, wherein the content-related data is selected from one or more of the following: title, composer, performer, genre, studio, director, rating, artist, and description of content of the corresponding media file.

15. The method of claim 1, wherein one or more computer-readable media have computer-executable instructions for performing the method recited in claim 1.

16. In a media authoring tool, one or more computer-readable media having computer-executable components for optimizing operation of a media player, said media player accessing a computer-readable medium for rendering media files stored thereon, said computer-readable medium further storing memory optimizing data associated with the media files, said components comprising:

a preparation module for obtaining metadata including binary data and text data for one or more selected media files, wherein the binary data includes a reference to a location of each of the selected media files on the computer-readable medium, and wherein the text data describes content associated with each of the selected media files;

an initialization module for creating a data structure adapted accessible by the media player prior to rendering the selected media files;

an organization module for populating the created data structure from the initialization module with the obtained metadata including the binary data and the text data from the preparation module; and a writer module for storing the populated data structure from the organization module in the last session of a plurality of sessions on the computer-readable medium with the selected media files, wherein the media player accesses the stored data structure to present the text data to a user and to navigate and render the media files via the reference.

17. The computer-readable media of claim 16, wherein the organization module associates numerical identifiers with the selected media files, said numerical identifiers being ordered sequentially and each corresponding to a respective one of the selected media files, and wherein the organization module stores the numerical identifiers in the data structure.

18. The computer-readable media of claim 16, wherein the preparation module identifies a logical sector number for each of the selected media files.

19. A method of optimizing operation of a media player, said media player accessing a computer-readable medium for rendering media files stored thereon, said computer-readable medium further storing memory optimizing data including binary data and text data associated with the media files, said method comprising:

retrieving the memory optimizing data including the binary data and the text data stored in the last session of a plurality of sessions on the computer-readable medium prior to rendering the media files, said memory optimizing data including the binary data and the text data being associated with one or more selected media files stored on the computer readable medium, wherein the binary data includes a reference to a location of each of the selected media files on the computer-readable medium, and wherein the text data describes content associated wit each of the selected media files; and identifying the selected media files in response to the retrieved memory optimizing data including the binary data and the text data, said selected media files adapted to be rendered by the media player.

20. The method of claim 19, further comprising displaying at least a portion of the text data by the media player in connection with the selected media files to which the memory optimizing data is associated during rendering of the selected media files.

21. The method of claim 19, wherein identifying comprises identifying the selected media files from a plurality of media files stored on the computer-readable medium.

22. The method of claim 19, further comprising:
obtaining metadata associated with the selected media files via the memory optimizing data; and
displaying the obtained metadata to a user on a display associated with the media player.

23. The method of claim 22, wherein said obtaining comprises reading logical sector numbers via the memory optimizing data, said logical sector numbers each identifying a respective one of the selected media files.

24. The method of claim 22, further comprising identifying a logical sector number for one of the selected media files by matching a file system storing said one of the selected media files to a file name associated with said one of the selected media files.

25. The method of claim 22, wherein said obtaining comprises reading menu information from the memory optimizing data, said menu information identifying the selected media files.

26. The method of claim 25, wherein said reading comprises reading menu information from the memory optimizing data for one of the selected media files.

27. The method of claim 25, wherein said menu information corresponds to a location in a menu associated with the selected media files, further comprising storing a reference to said menu information.

28. The method of claim 22, wherein said obtaining comprises obtaining a thumbnail image via the memory optimizing data, said thumbnail image corresponding to one or more of the selected media files.

29. The method of claim 22, wherein said obtaining comprises reading a playlist from the memory optimizing data, said playlist identifying one or more of the selected media files.

30. The method of claim 22, wherein said obtaining comprises identifying a language from the memory optimizing data, said identified language corresponding to menu information associated with the selected media files.

31. The method of claim 22, further comprising:
storing the obtained metadata in memory associated with the media player; and
deleting the displayed metadata from the memory.

32. The method of claim 22, wherein the content-related data is selected from one or more of the following: title, composer, performer, genre, studio, director, rating, artist, and description of content of the corresponding media file.

33. The method of claim 19, wherein one or more computer-readable media have computer-executable instructions for performing the method recited in claim 19.

34. A media player having one or more computer-readable media storing computer-executable components for optimizing operation of the media player, said media player accessing a computer-readable medium for rendering media files stored thereon, said computer-readable medium further storing memory optimizing data including binary data and text data associated with the media files, said components comprising:
an input module for retrieving the memory optimizing data including the binary data and the text data stored in the last session of a plurality of sessions on the computer-readable medium prior to rendering the media files, said memory optimizing data including the binary data and the text data being associated with one or more selected media files stored on the computer readable medium, wherein the binary data includes a reference to a location of each of the selected media files on the computer-readable medium, and wherein the text data describes content associated with each of the selected media files; and
a filter module for identifying the selected media files in response to the retrieved memory optimizing data including the binary data and the text data from the input module, said selected media files adapted to be rendered by the media player.

35. The media player of claim 34, further comprising a user interface module for displaying at least a portion of the text data in connection with the selected media files to which the memory optimizing data is associated during rendering of the selected media files.

36. The media player of claim 34, wherein the filter module identifies the selected media files from a plurality of media files stored on the computer-readable medium.

37. The media player of claim 34, wherein the filter module obtains metadata associated with the selected media files via the memory optimizing data, and wherein the filter module displays the obtained metadata to a user on a display associated with the media player.

38. The media player of claim 34, wherein the filter module reads logical sector numbers via the memory optimizing data, said logical sector numbers each identifying a respective one of the selected media files.

39. The media player of claim 34, wherein the filter module reads menu information from the memory optimizing data, said menu information identifying the selected media files.

40. The media player of claim 34, wherein the filter module obtains a thumbnail image via the memory optimizing data, said thumbnail image corresponding to one or more of the selected media files.

41. The media player of claim 34, wherein the filter module reads a playlist from the memory optimizing data, said playlist identifying one or more of the selected media files.

42. The media player of claim 34, wherein the filter module identifies a language from the memory optimizing data, said identified language corresponding to menu information associated with the selected media files.

43. A computer-readable medium having stored thereon a data structure representing memory optimizing data including binary data and textual data associated with one or more media files stored thereon, said memory optimizing data including the binary data and the textual data optimizing operation of a media player, said media player accessing the computer-readable medium for rendering the media files, said data structure comprising:
a header including an offset field storing a reference to the textual and the binary data associated with one or more media files, wherein the textual data describes content associated with each of the media files, and wherein the binary data includes a location of each of the selected media files on the computer-readable medium; and a directory table matching directory numbers to directory names associated with the one or more media files, wherein the header references the media files by the directory numbers.

44. The computer-readable medium of claim 43, wherein the directory table has sequentially numbered entries each corresponding to one of the directory names.

45. The computer-readable medium of claim 44, wherein the entries each identify a parent directory for said one of the directory names.

46. The computer-readable medium of claim 43, wherein the header includes separate offset fields for audio media files, video media files, and still image media files.

47. The computer-readable medium of claim 43, further comprising a locale identifier having a language field storing a language identifier identifying a language of textual metadata associated with the media files.

48. The computer-readable medium of claim 43, wherein the content-related data is selected from one or more of the following: title, composer, performer, genre, studio, director, rating, artist, and description of content of the corresponding media file.

49. The computer-readable medium of claim 43, wherein the metadata comprise one or more of the following associated with the media files: menu information, playlist information, and thumbnail images.

50. The computer-readable medium of claim 43, further comprising a sector field storing a logical sector number for each of the media files.

51. The computer-readable medium of claim 43, wherein the computer-readable medium stores data in sectors, and wherein the offset field is stored at a sector boundary.

52. The method of claim 1, wherein the text data comprises one or more of the following: composer, performer, genre, studio, director, rating, and artist.

* * * * *